United States Patent
Lee et al.

(10) Patent No.: US 10,266,385 B2
(45) Date of Patent: Apr. 23, 2019

(54) COLD-WATER GENERATING TANK, AND WATER COOLER EQUIPPED WITH SAME

(71) Applicant: COWAY CO., LTD., Chungcheongnam-do (KR)

(72) Inventors: Soo-Young Lee, Seoul (KR); Gyeong-Min Lee, Seoul (KR); Kyu-Jun Kim, Seoul (KR)

(73) Assignee: Coway Co., Ltd (KR)

( * ) Notice: Subject to any disclaimer, the term of this patent is extended or adjusted under 35 U.S.C. 154(b) by 61 days.

(21) Appl. No.: 15/532,786

(22) PCT Filed: Dec. 4, 2015

(86) PCT No.: PCT/KR2015/013242
§ 371 (c)(1),
(2) Date: Jun. 2, 2017

(87) PCT Pub. No.: WO2016/089167
PCT Pub. Date: Jun. 9, 2016

(65) Prior Publication Data
US 2017/0362073 A1  Dec. 21, 2017

(30) Foreign Application Priority Data

Dec. 5, 2014  (KR) .................. 10-2014-0174435
Dec. 5, 2014  (KR) .................. 10-2014-0174436

(51) Int. Cl.
| | |
|---|---|
| *B67D 3/00* | (2006.01) |
| *F25C 1/08* | (2006.01) |
| *F28D 7/02* | (2006.01) |
| *F28F 1/12* | (2006.01) |

(Continued)

(52) U.S. Cl.
CPC .............. *B67D 3/0009* (2013.01); *F25C 1/08* (2013.01); *F25D 31/003* (2013.01); *F28D 7/02* (2013.01);
(Continued)

(58) Field of Classification Search
CPC . B67D 3/0009; F25D 31/003; F25D 2400/00; F25D 2303/0841; F28D 7/02; F25C 1/08; F28F 1/12
(Continued)

(56) References Cited

U.S. PATENT DOCUMENTS 2,720,085 A * 10/1955 Boyle ..................... F25D 16/00
                                                239/225.1
2,752,763 A *  7/1956 Shepard ................ F25D 31/003
                                                62/306

(Continued)

FOREIGN PATENT DOCUMENTS

| JP | 07300197 | 11/1995 |
|---|---|---|
| JP | 2003247788 | 9/2003 |

(Continued)

*Primary Examiner* — Ana M Vazquez
(74) *Attorney, Agent, or Firm* — The Farrell Law Firm, P.C.

(57) ABSTRACT

A cold-water generating tank is provided for generating cold water by using the ice thermal storage method and a water cooler equipped with same. The cold-water generating tank includes a tank body which houses, on the inside thereof, an ice storage liquid cooled by means of a cooling unit; a cooling tube provided on the inside of the tank body in order to cool the ice storage liquid housed inside the tank body; and a cold-water generating unit which has a heat exchange tube forming a flow pathway where inflowing water becomes cold water through heat exchange with the ice storage liquid, and has an extension member positioned on the outer circumferential surface of the heat exchange tube in order to widen the area of contact with the ice storage liquid.

16 Claims, 28 Drawing Sheets

(51) Int. Cl.
*F25D 31/00* (2006.01)
*F28F 9/02* (2006.01)
*F28D 7/08* (2006.01)
*F28D 20/00* (2006.01)
*F28F 1/24* (2006.01)
*F25B 25/00* (2006.01)

(52) U.S. Cl.
CPC ............ *F28D 7/024* (2013.01); *F28D 7/087* (2013.01); *F28D 20/0034* (2013.01); *F28F 1/12* (2013.01); *F28F 1/24* (2013.01); *F28F 9/0273* (2013.01); *F25B 25/005* (2013.01); *F25D 2303/0841* (2013.01); *F25D 2400/00* (2013.01); *Y02E 60/142* (2013.01)

(58) Field of Classification Search
USPC .......................................................... 62/190
See application file for complete search history.

(56) References Cited

U.S. PATENT DOCUMENTS

| | | | |
|---|---|---|---|
| 4,934,150 A * | 6/1990 | Fessler | B67D 1/0864 |
| | | | 62/139 |
| 2007/0199688 A1* | 8/2007 | Okonski, Sr. | F22B 9/12 |
| | | | 165/163 |
| 2014/0223942 A1* | 8/2014 | Lee | F28D 20/02 |
| | | | 62/190 |

FOREIGN PATENT DOCUMENTS

| | | | | |
|---|---|---|---|---|
| JP | 2014058323 | | 4/2014 | |
| KR | 101174033 | | 8/2012 | |
| KR | 1020130035888 | | 4/2013 | |
| WO | WO 2013048149 | | 4/2013 | |
| WO | WO-2013048149 A1 * | | 4/2013 | ............ F28D 20/02 |

\* cited by examiner

[Figure 1]
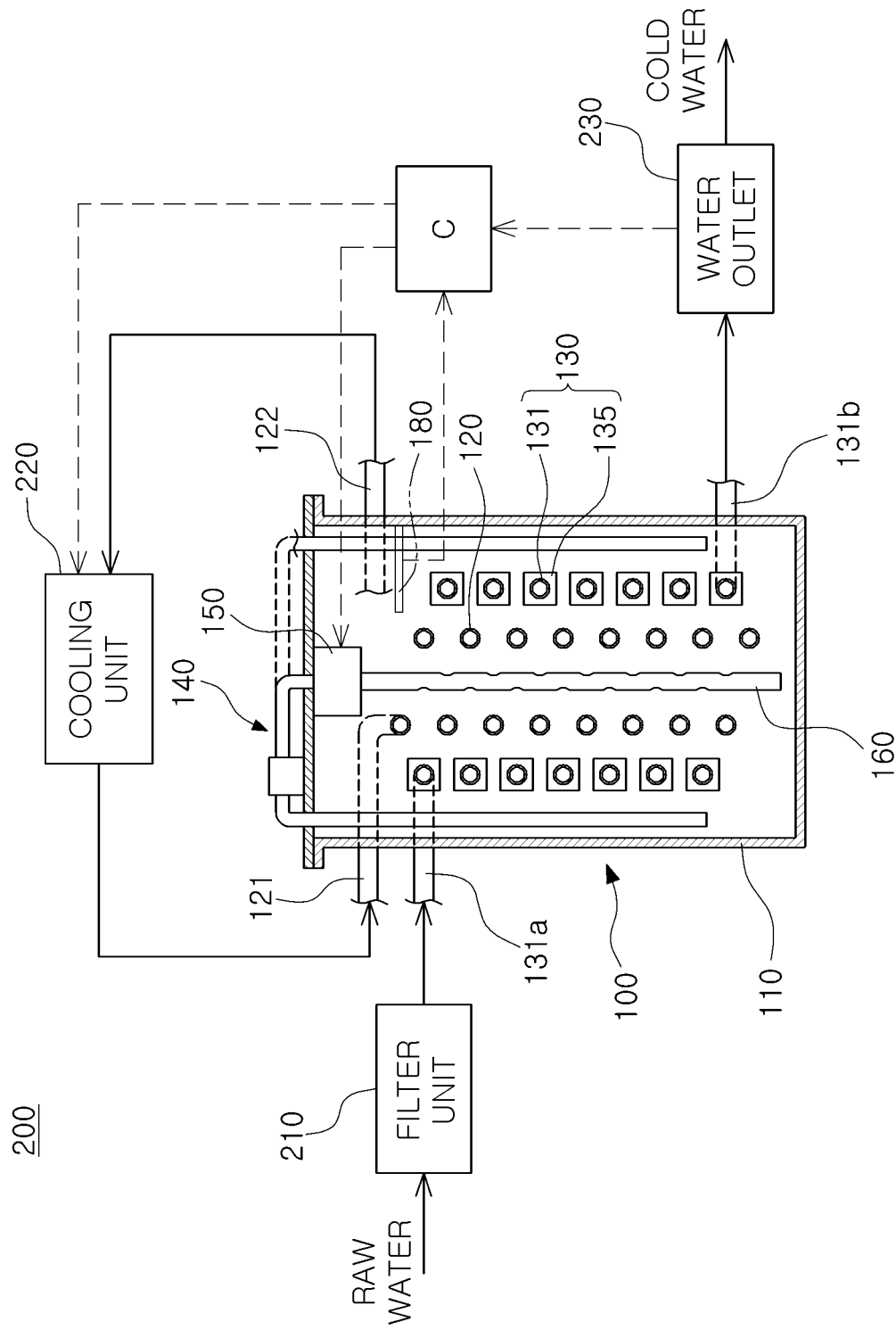

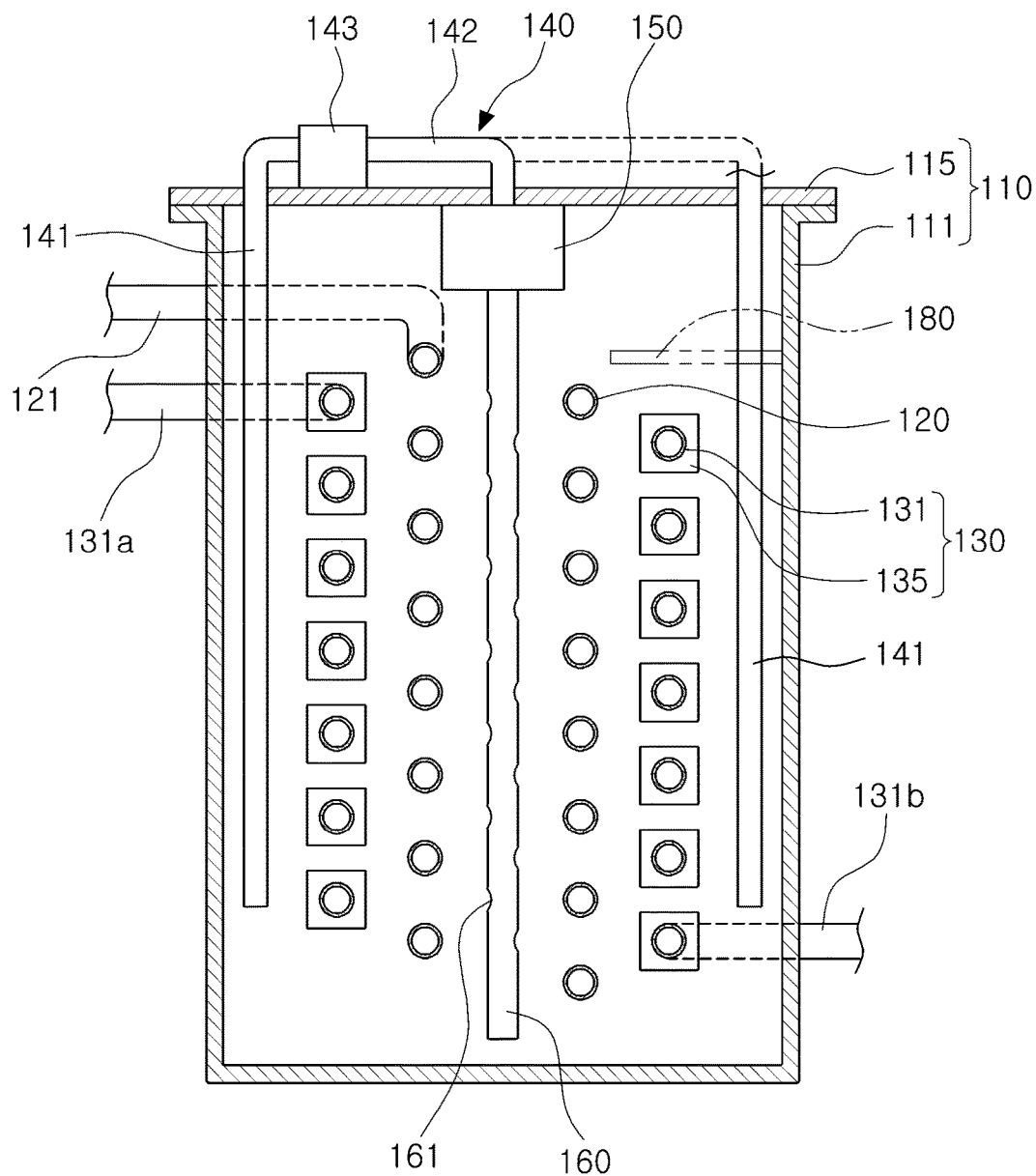
【Figure 2】

[Figure 3]
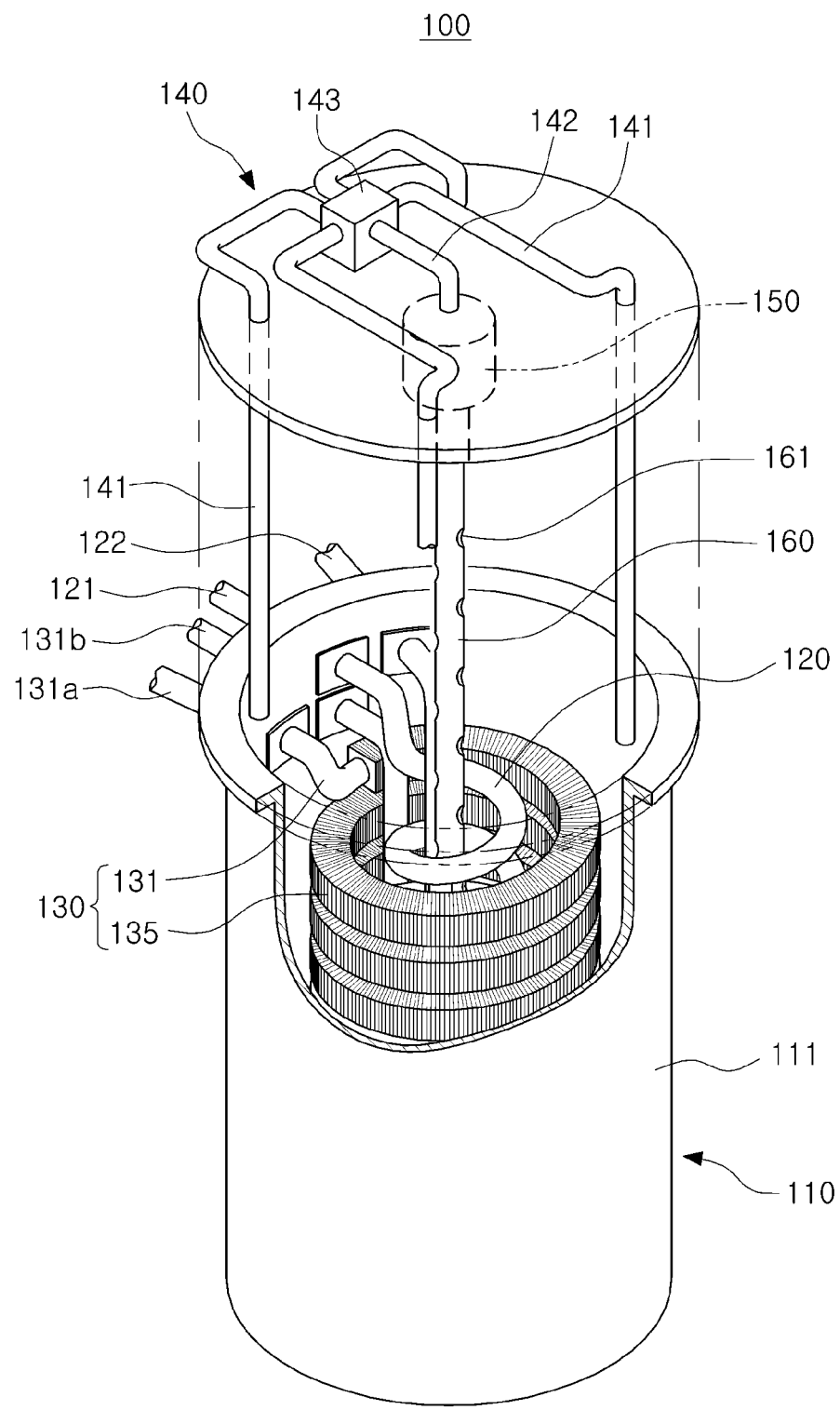

【Figure 4】
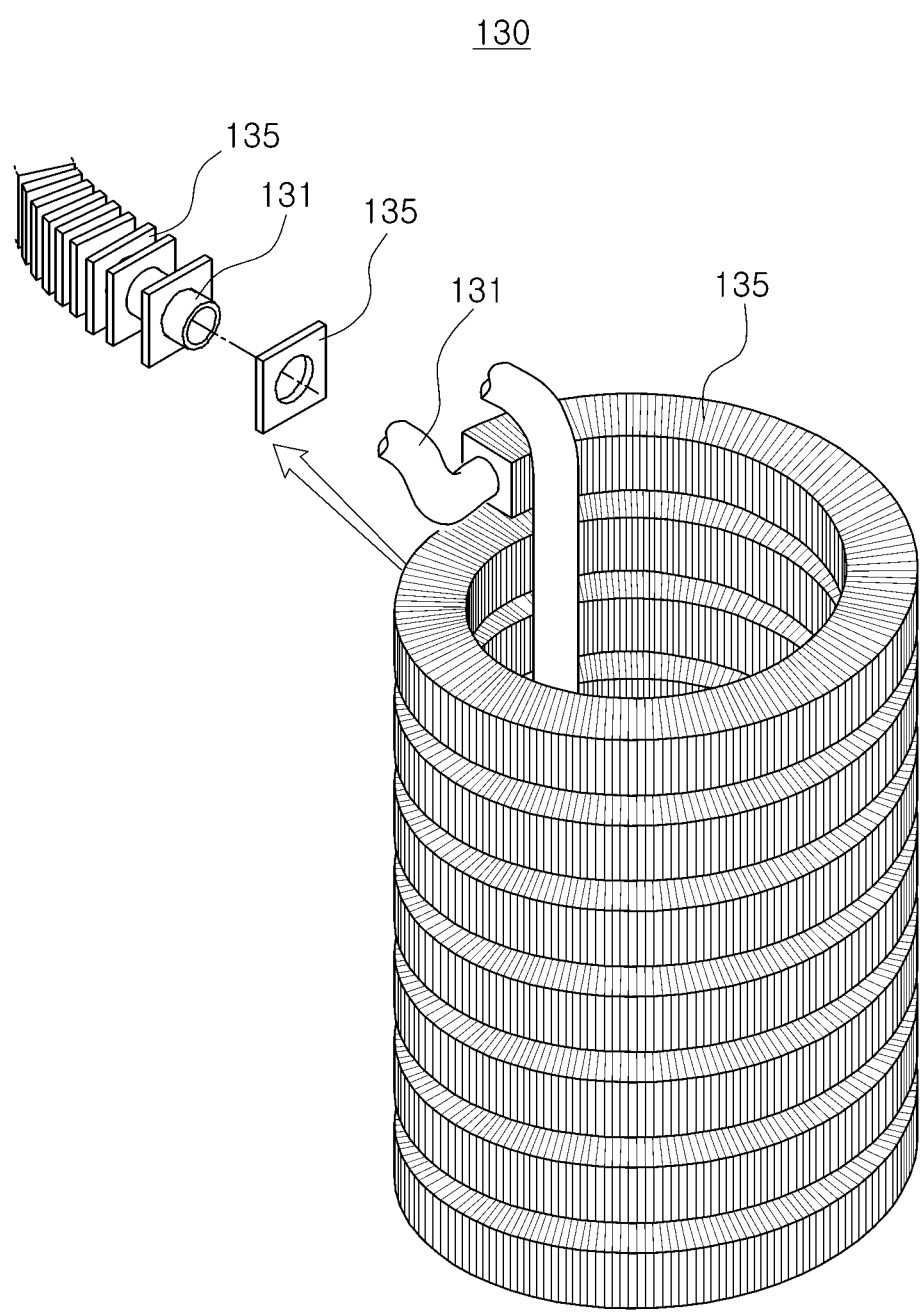

[Figure 5]
(a)
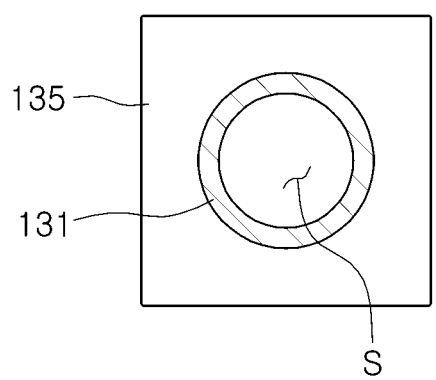
(b)
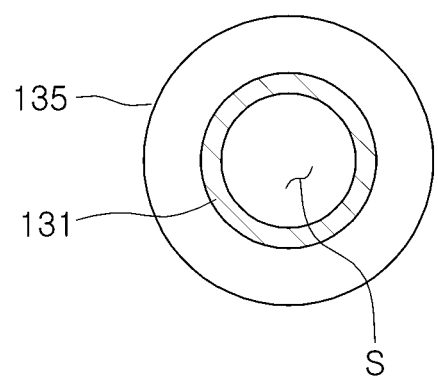

【Figure 6】
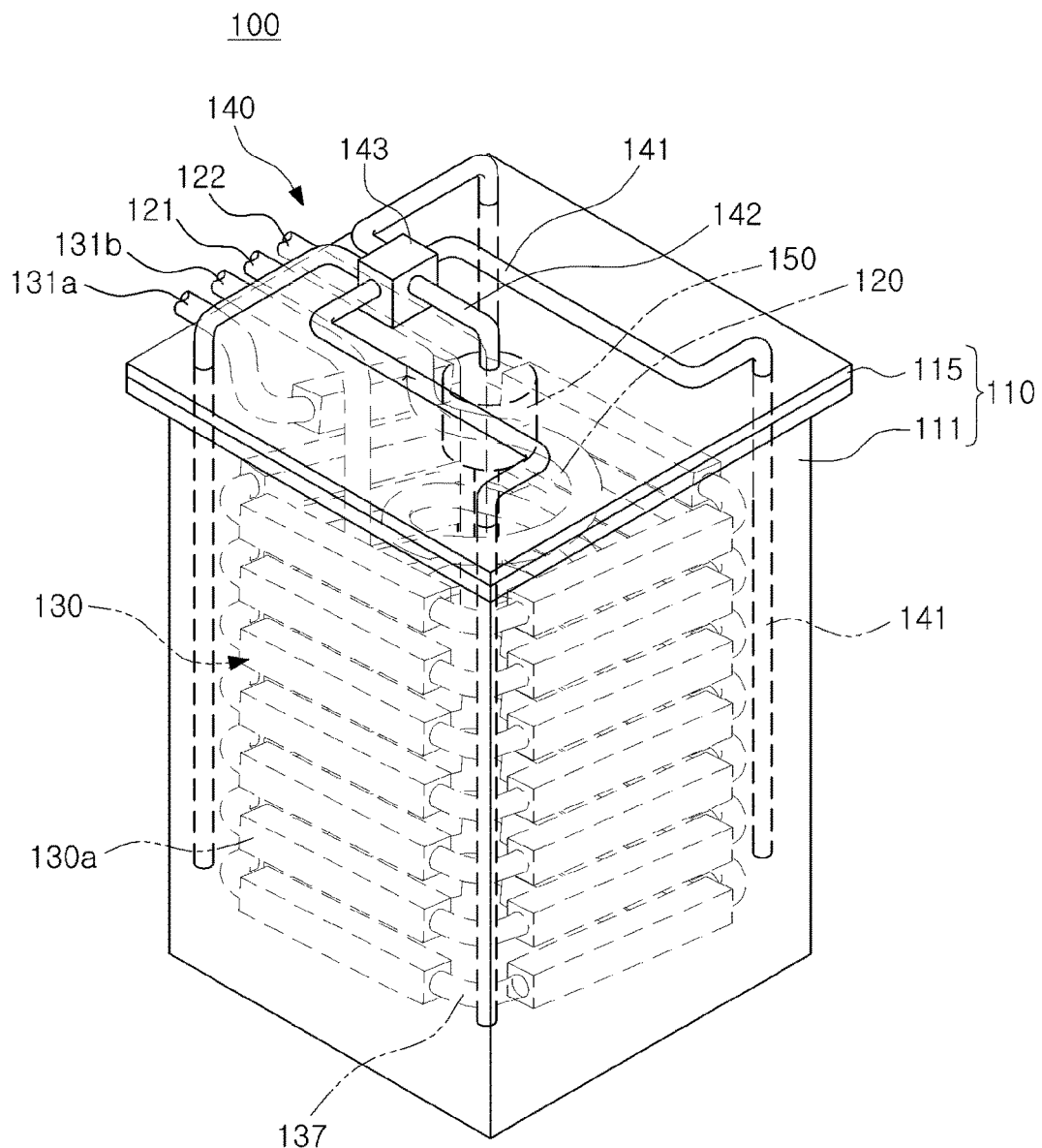

【Figure 7】
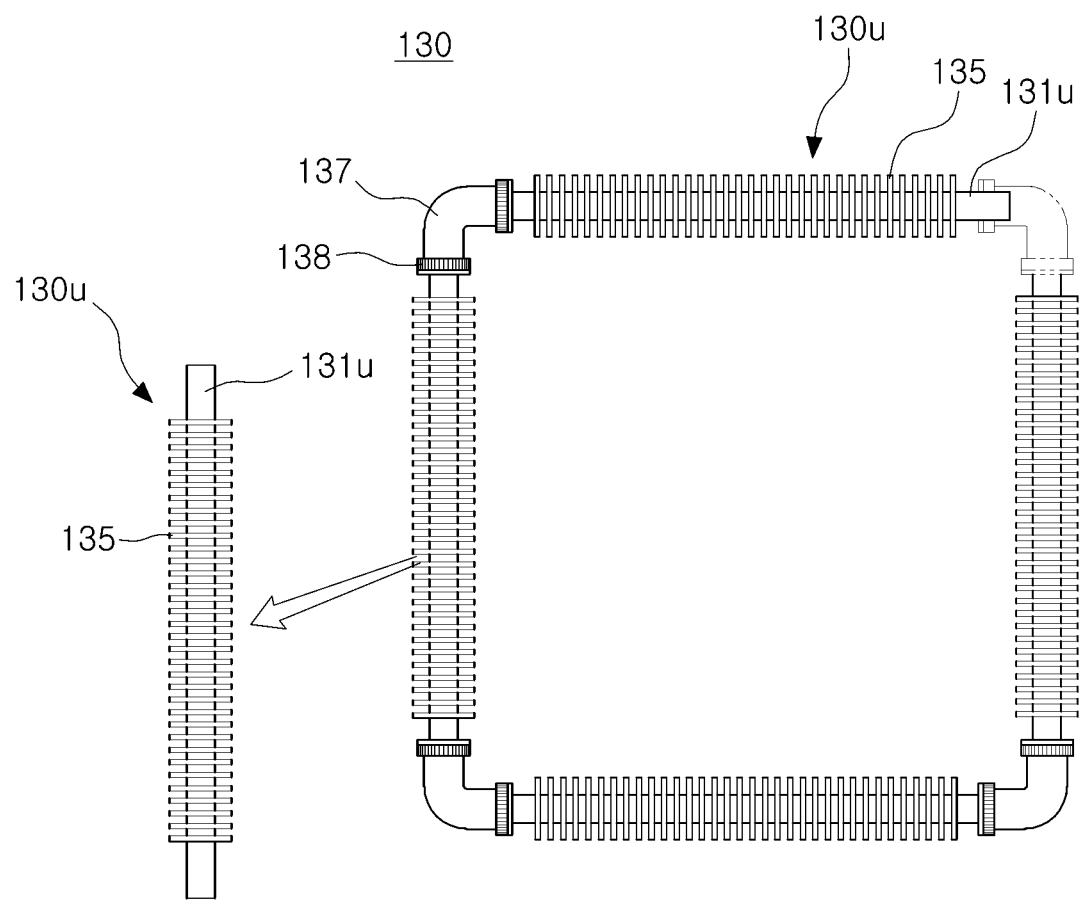

【Figure 8】
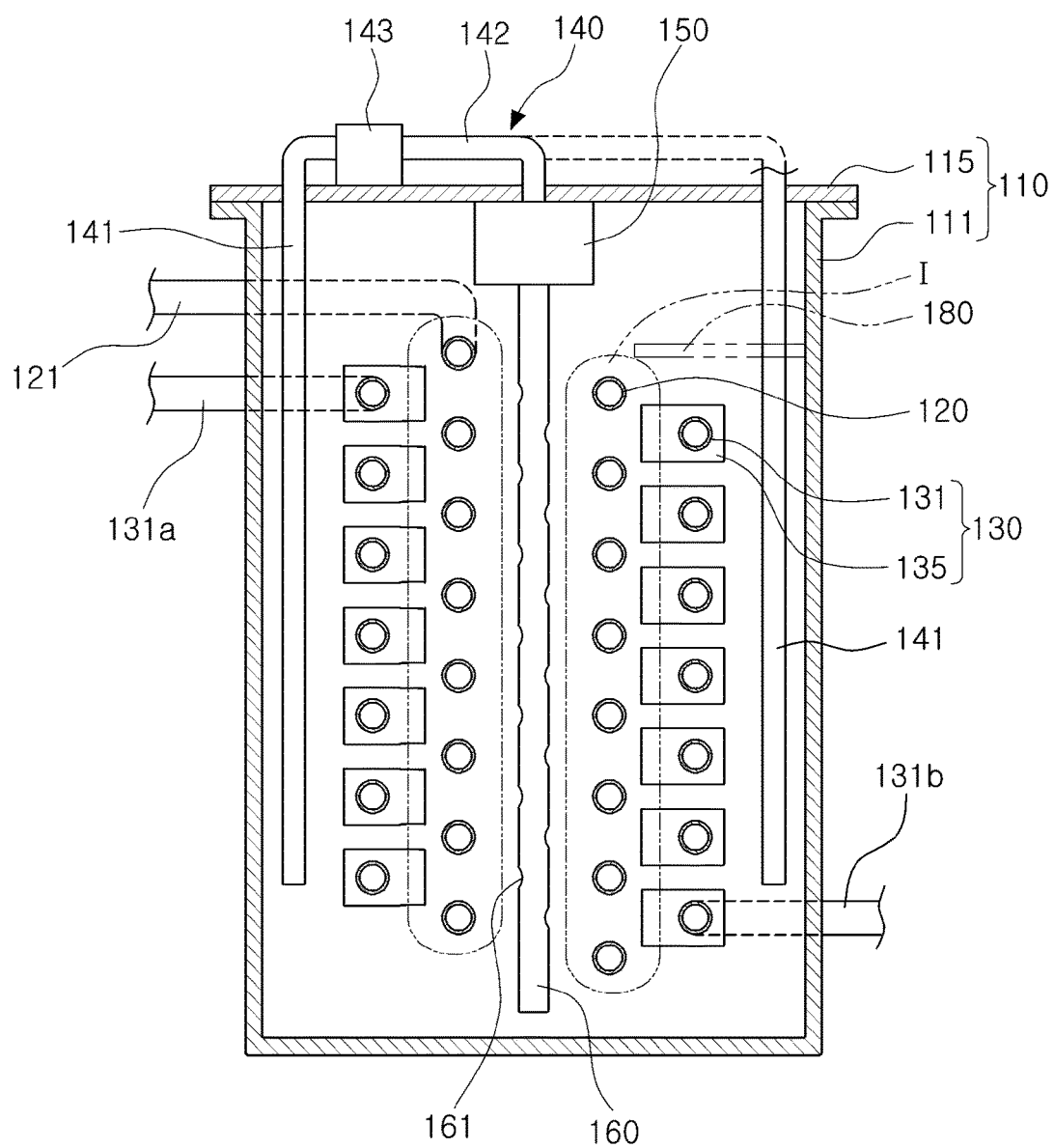

[Figure 9]
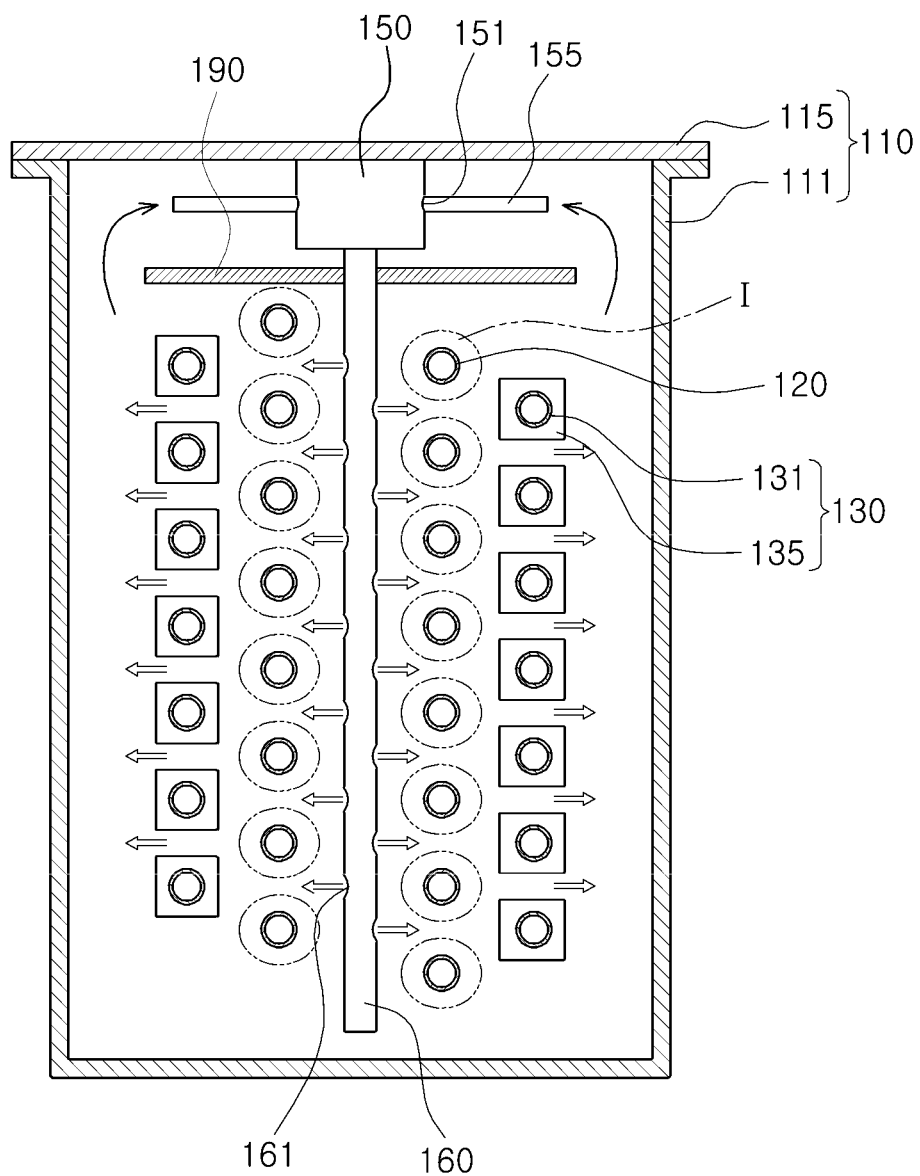

【Figure 10】
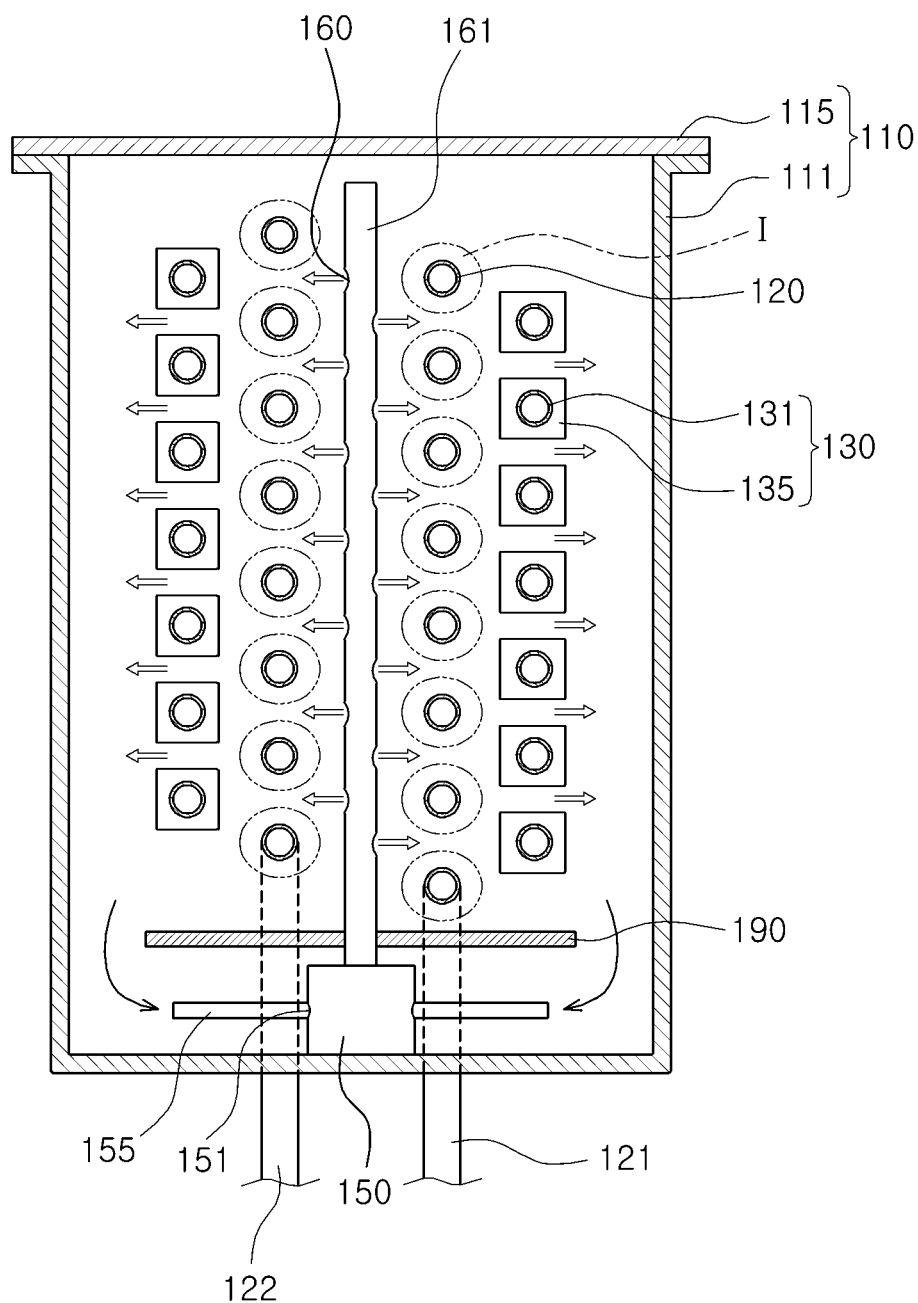

【Figure 11】
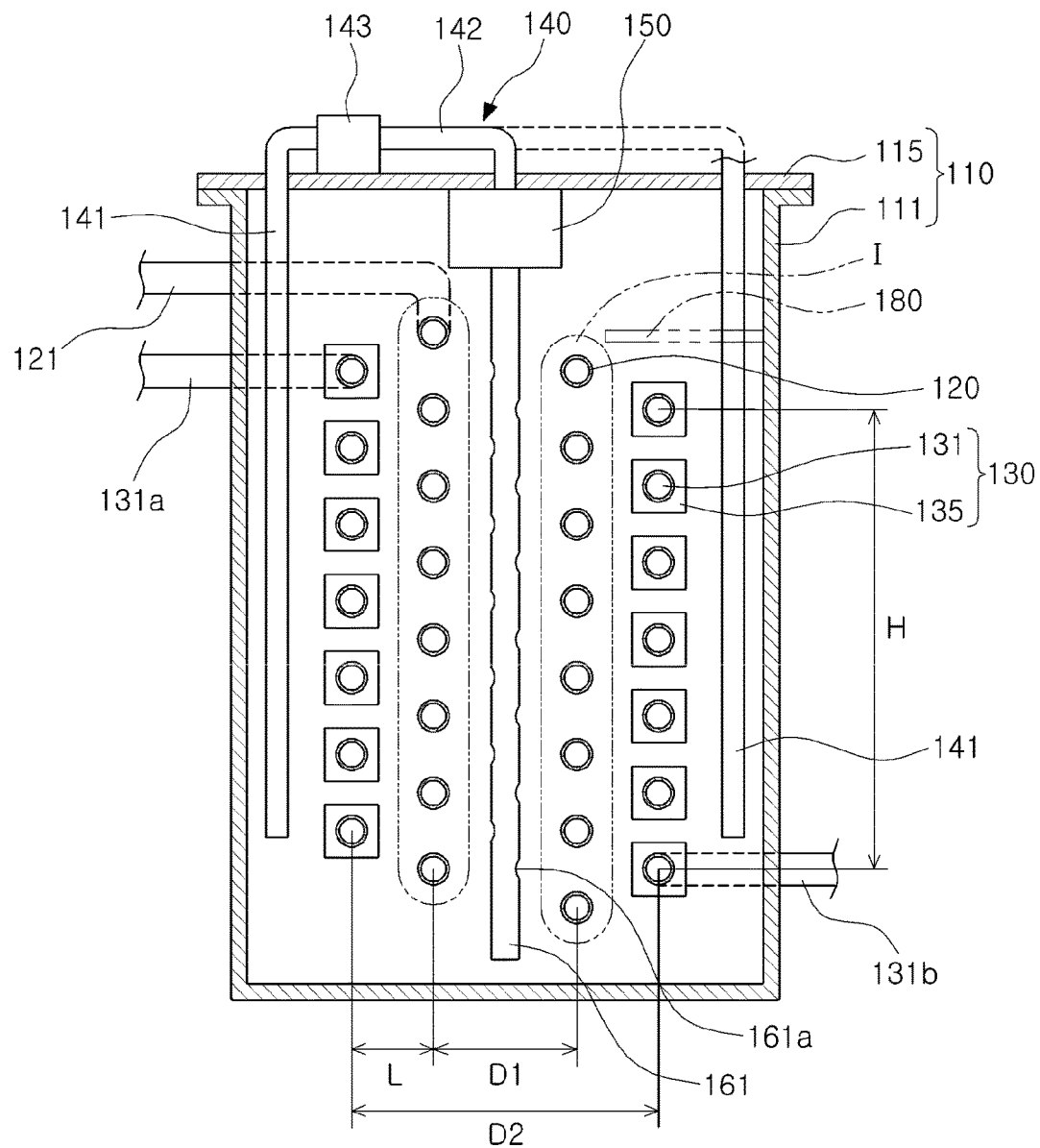

【Figure 12】
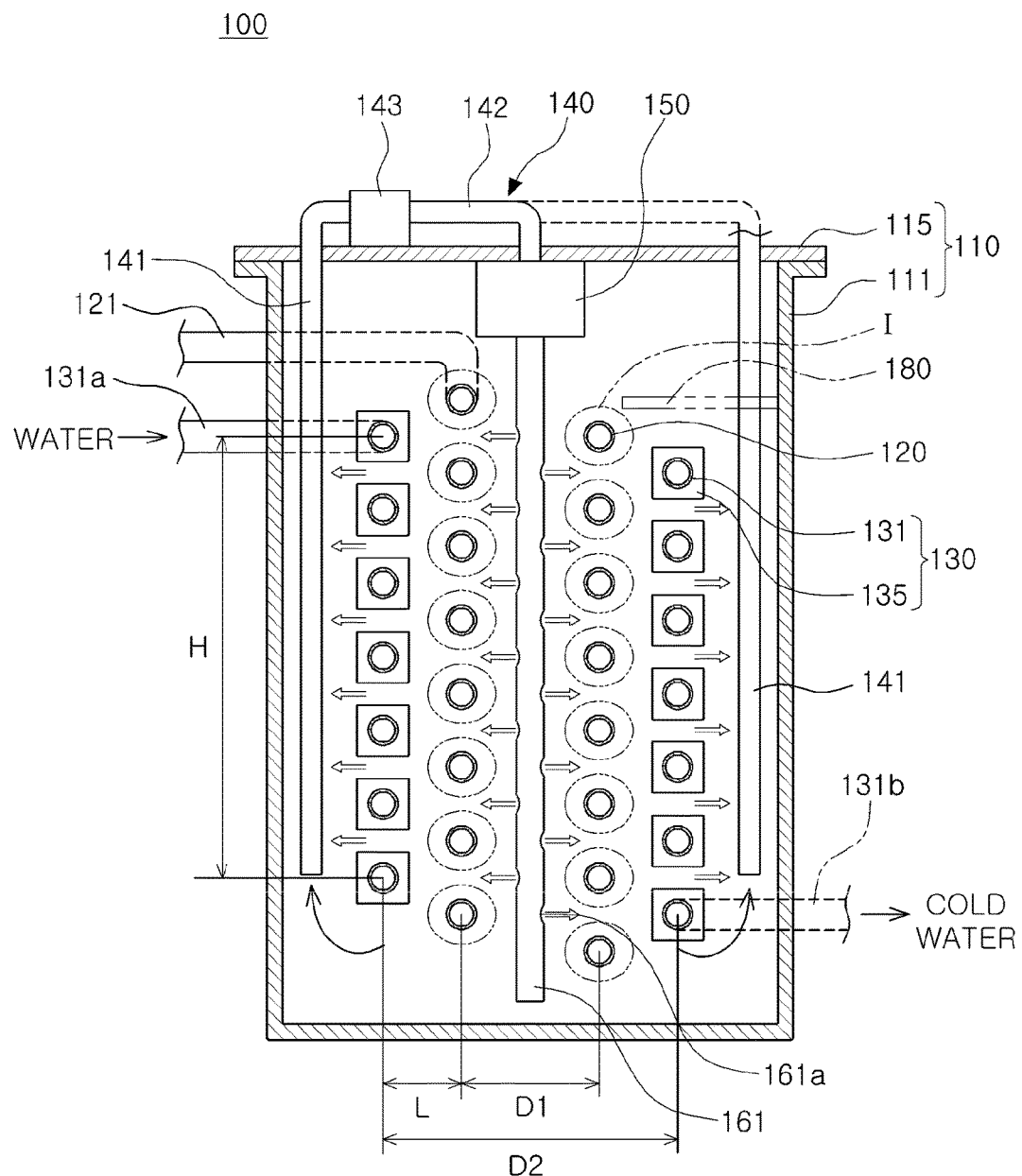

【Figure 13】
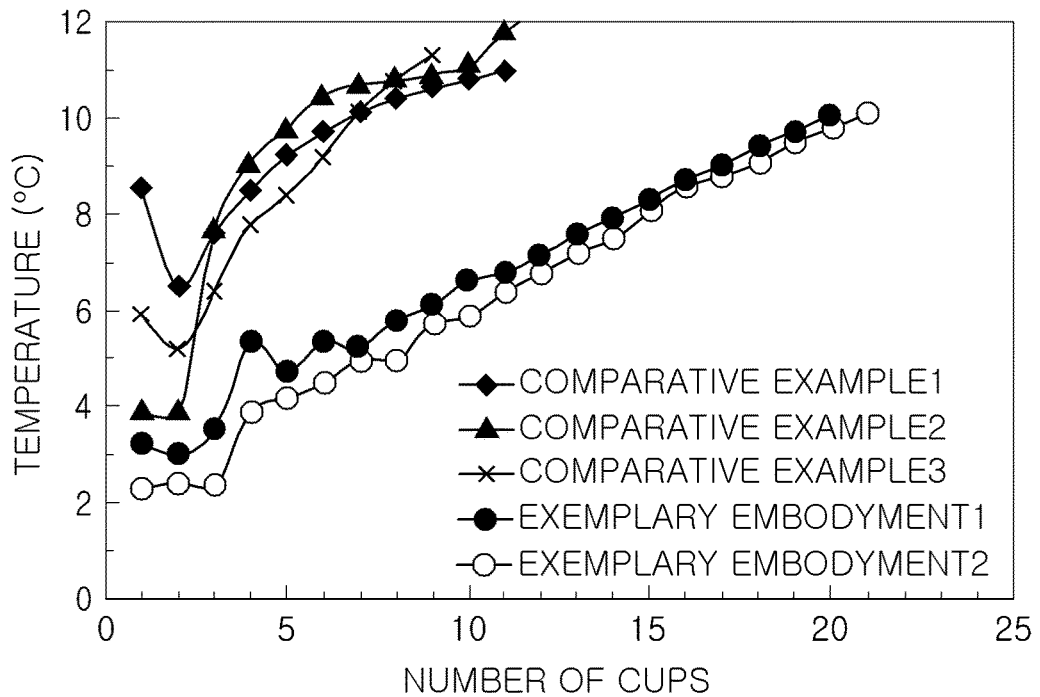
【Figure 14】
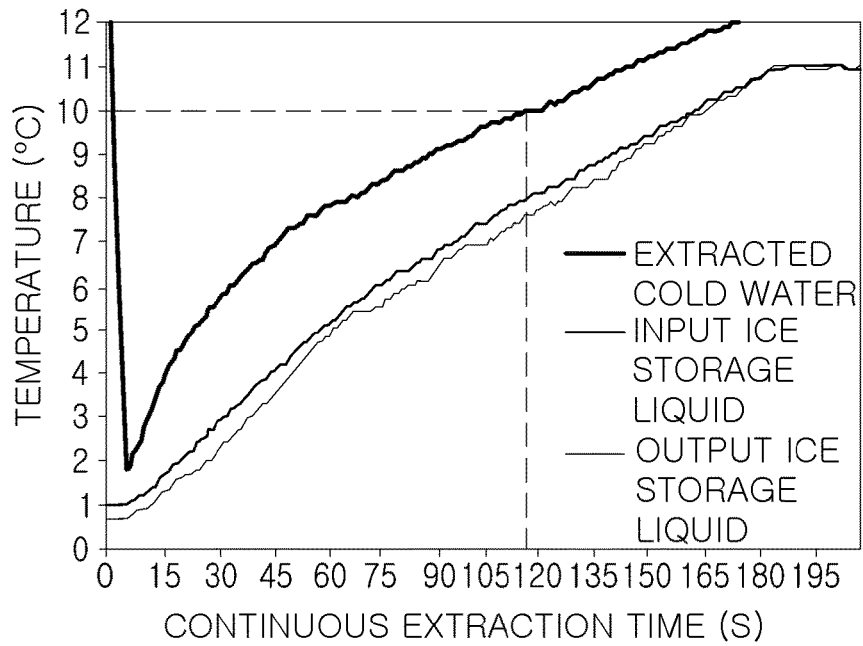

【Figure 15】
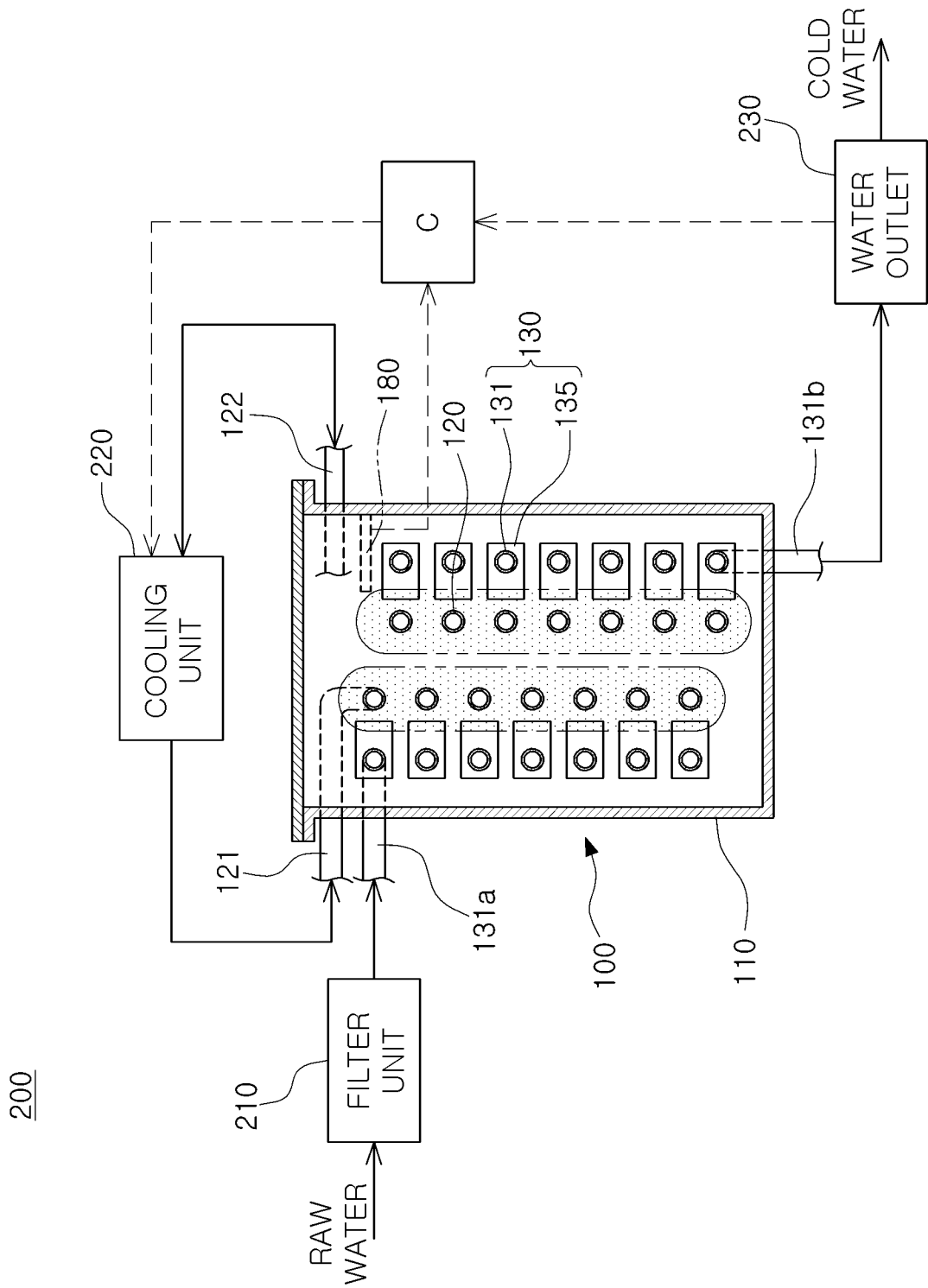

【Figure 16】
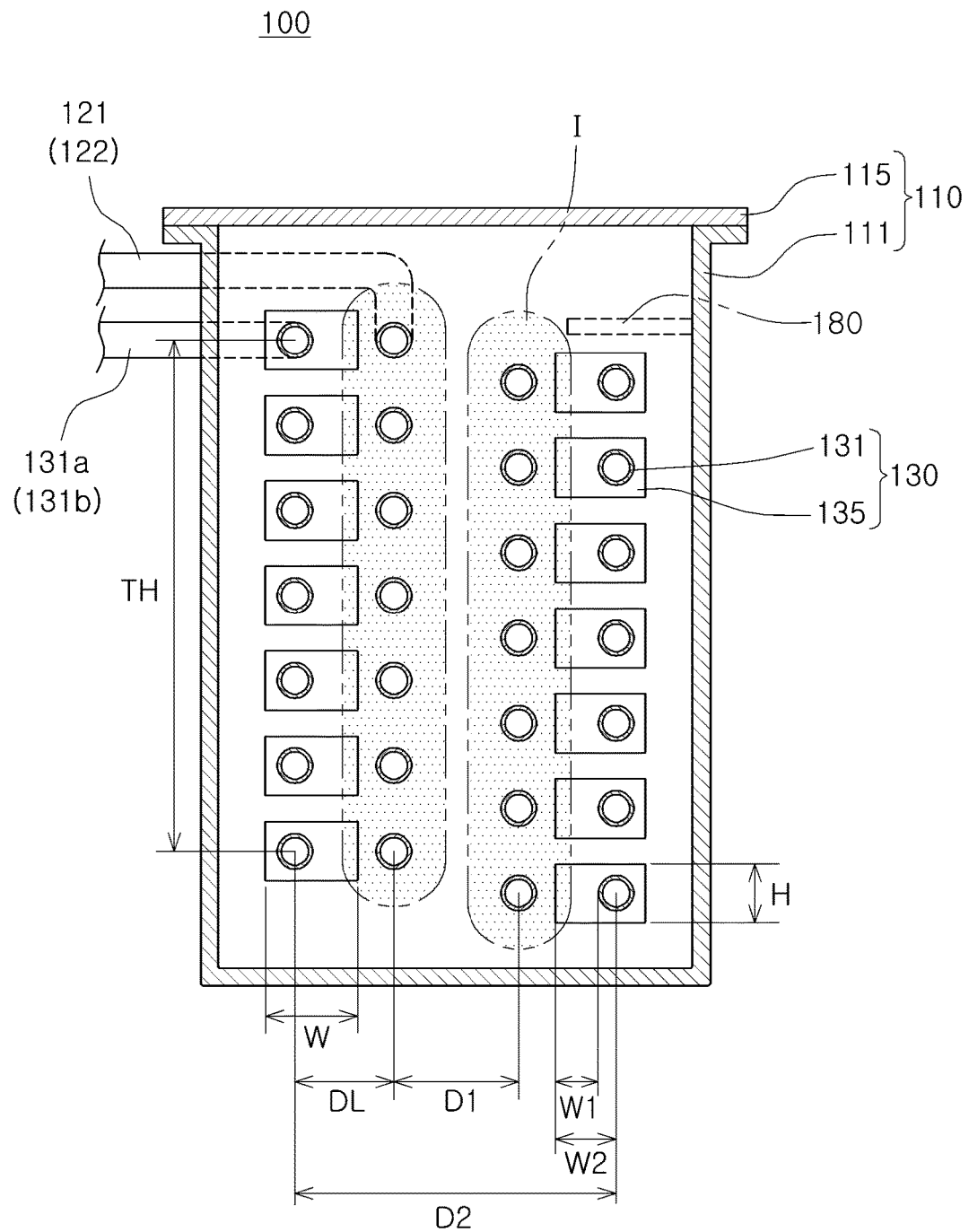

[Figure 17]
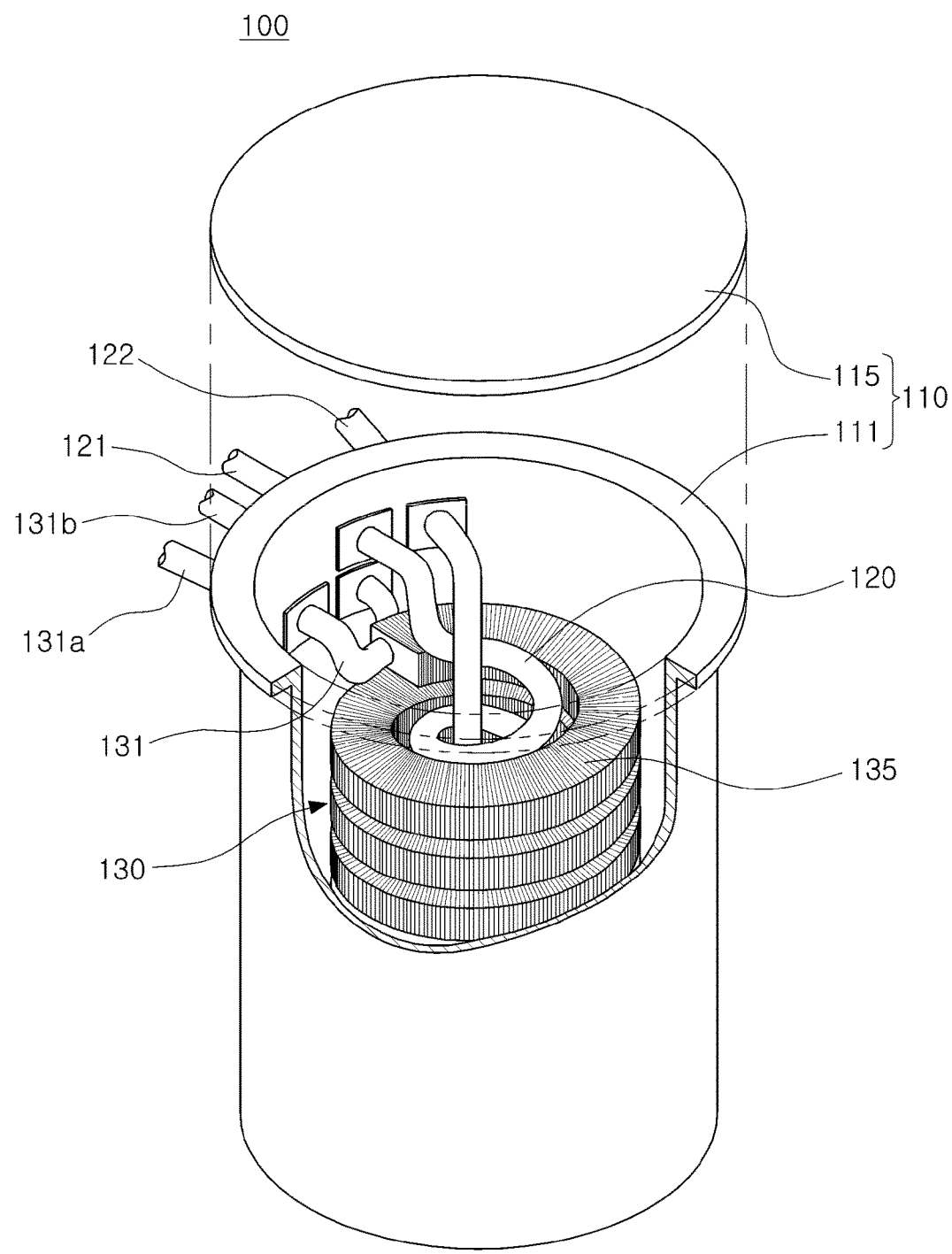

【Figure 18】
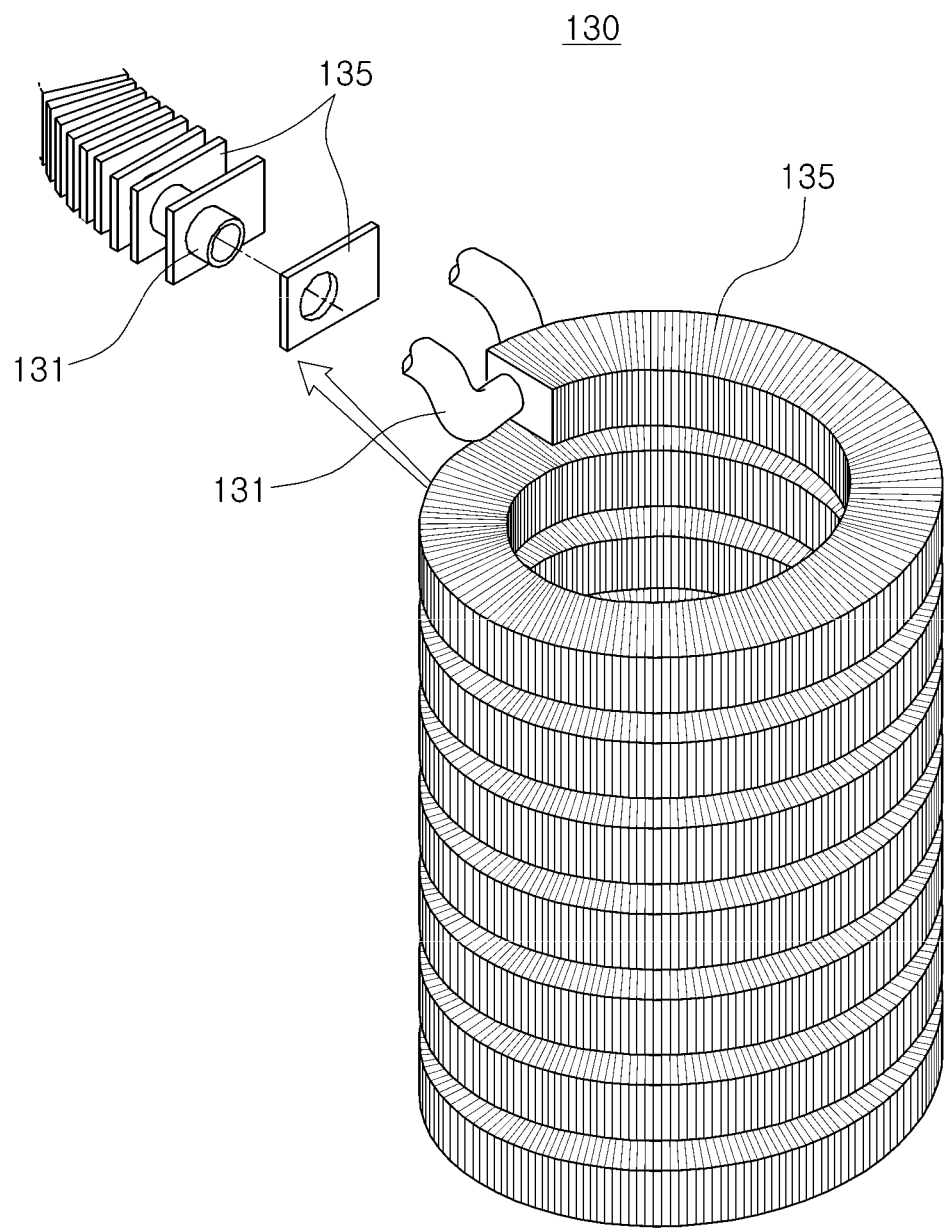

[Figure 19]
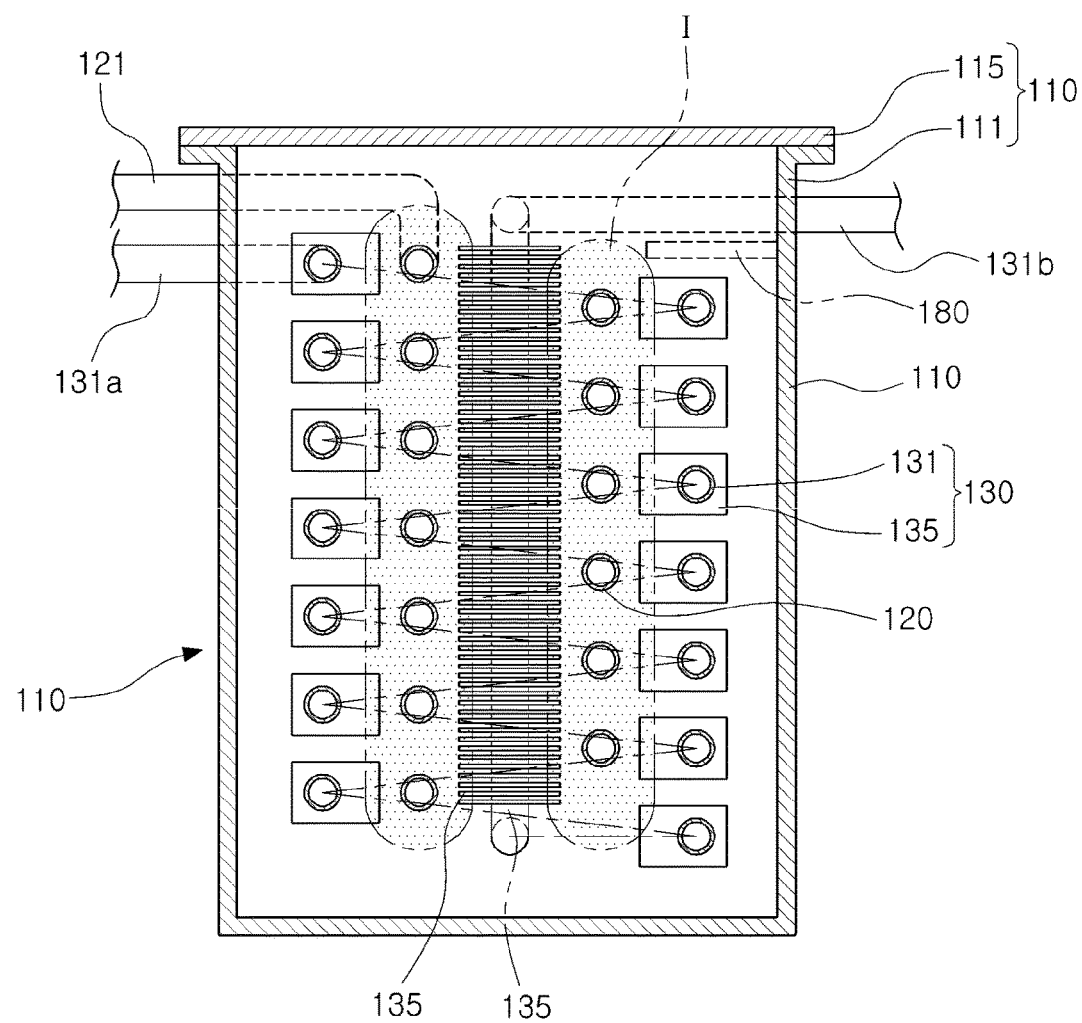

[Figure 20]
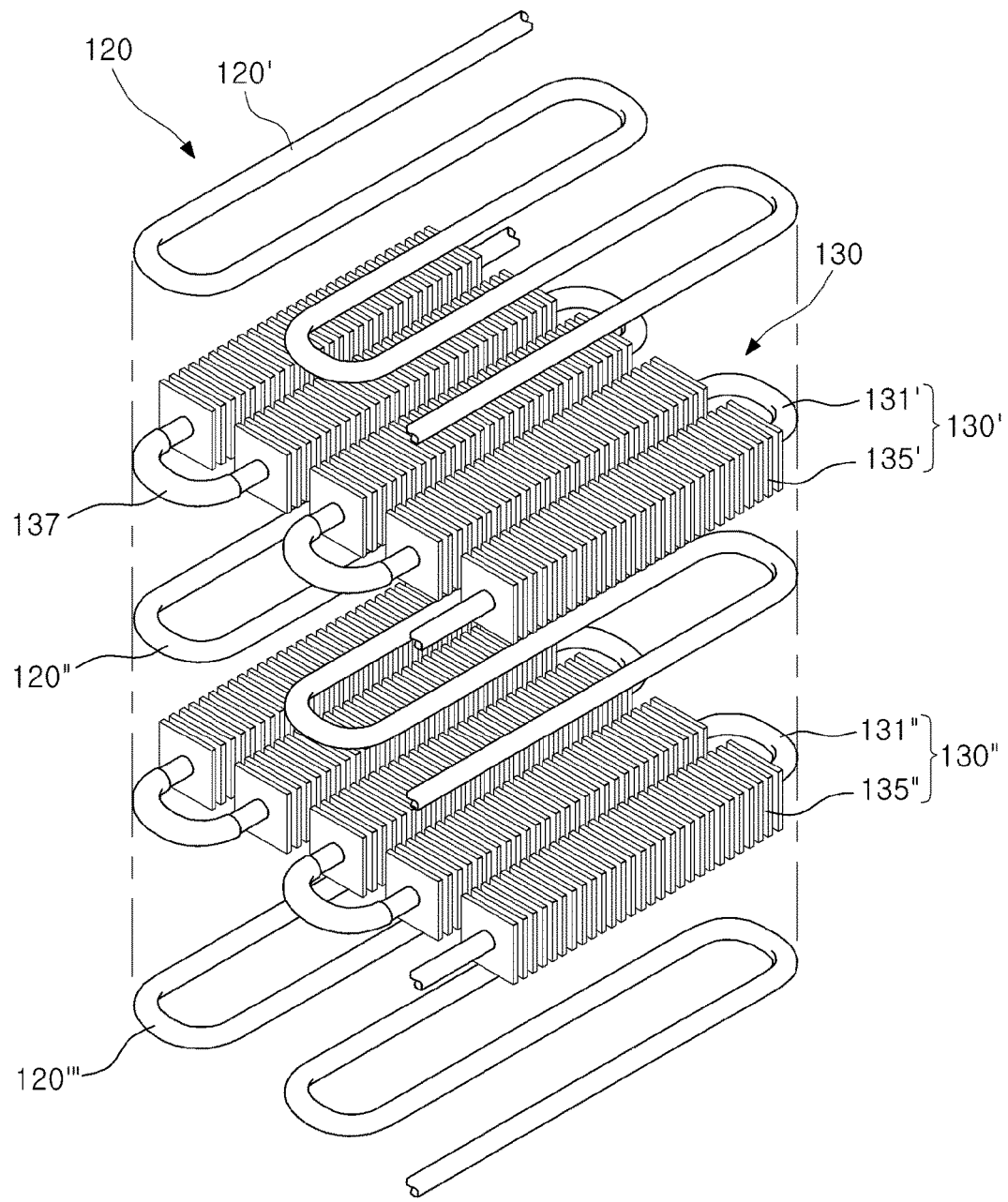

【Figure 21】
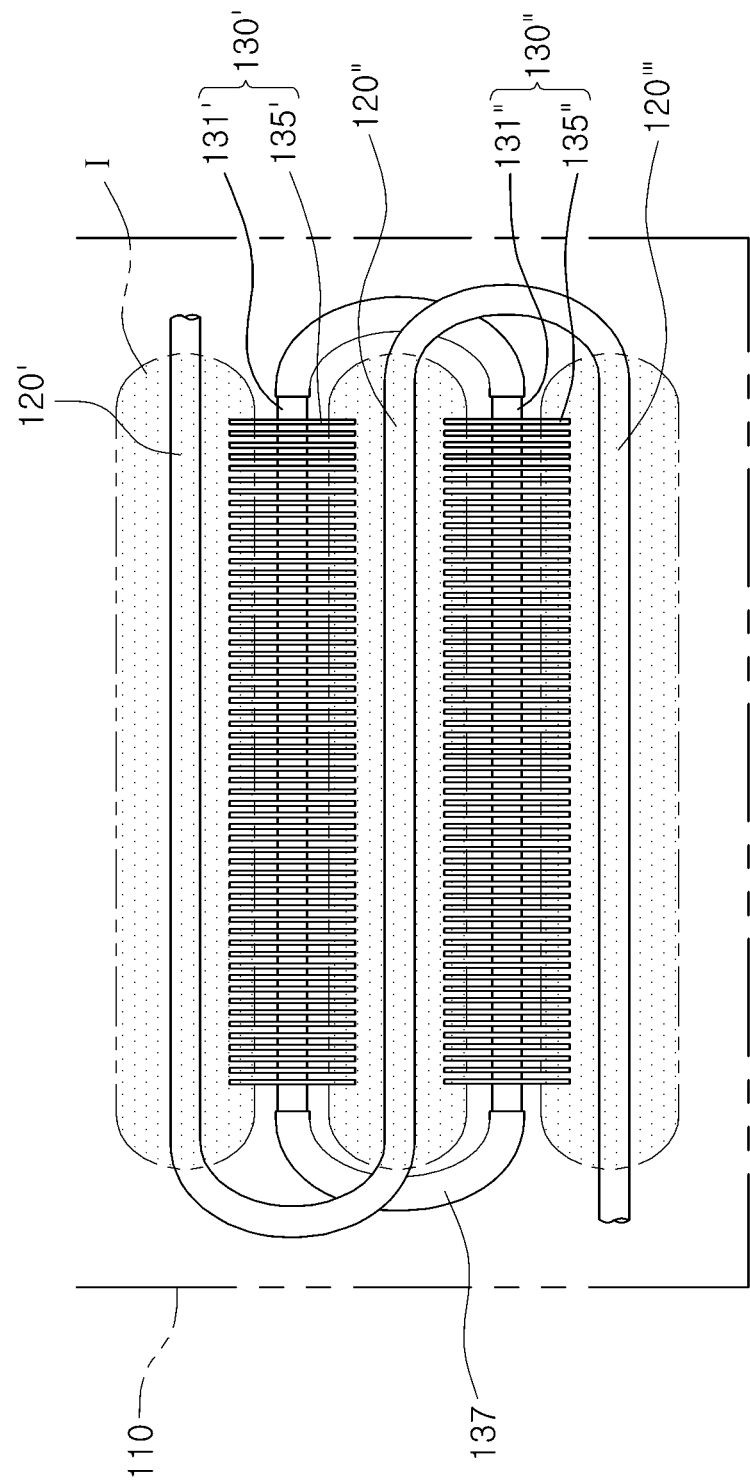

【Figure 22】
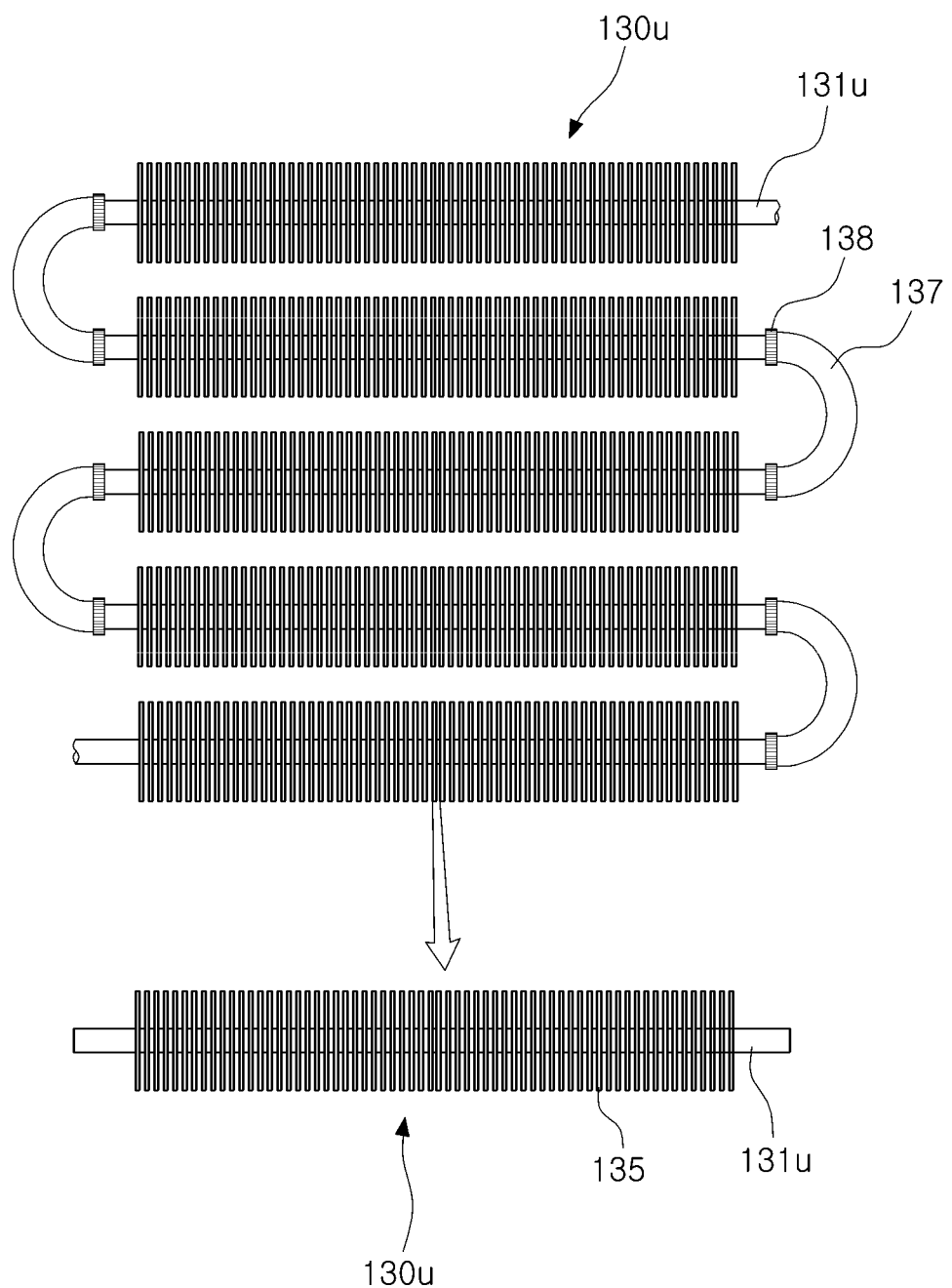

[Figure 23]
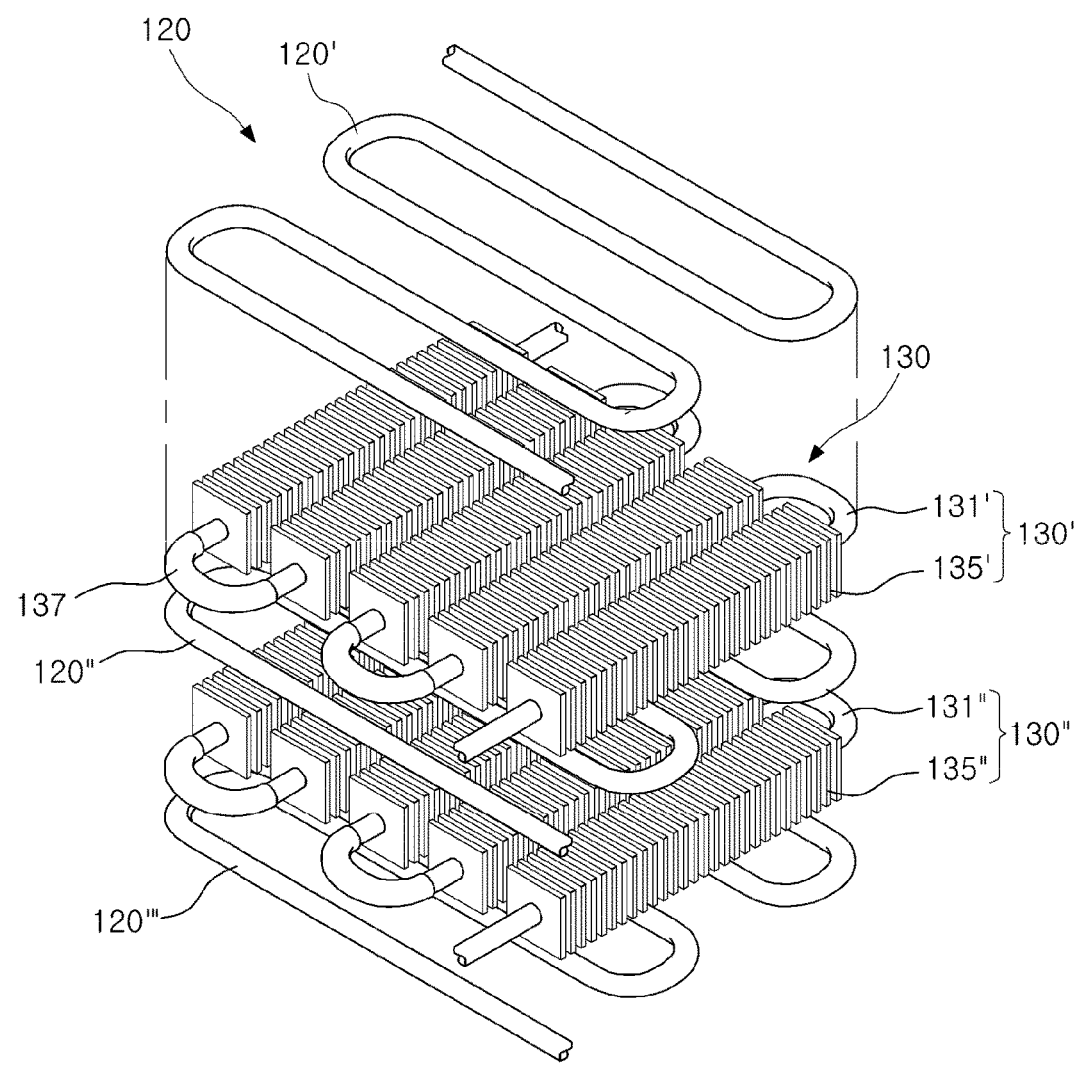

【Figure 24】
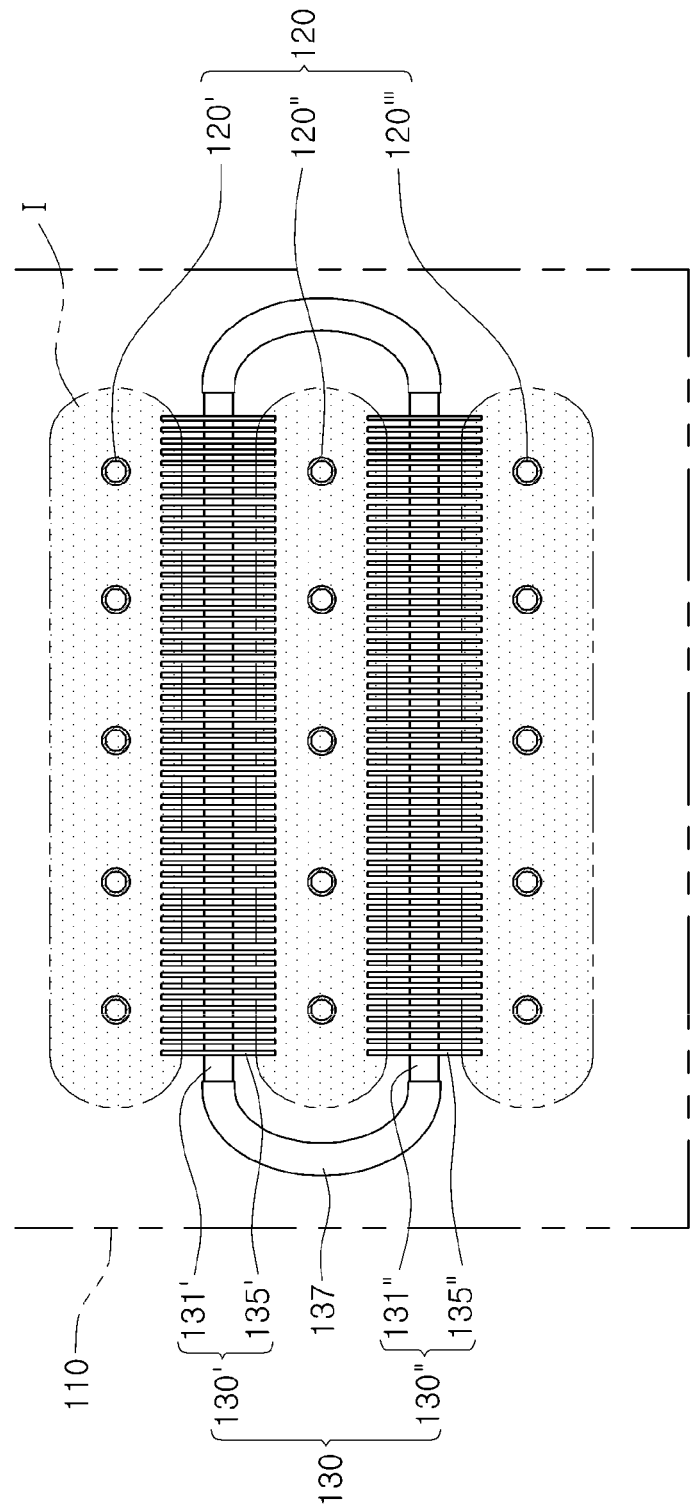

【Figure 25】
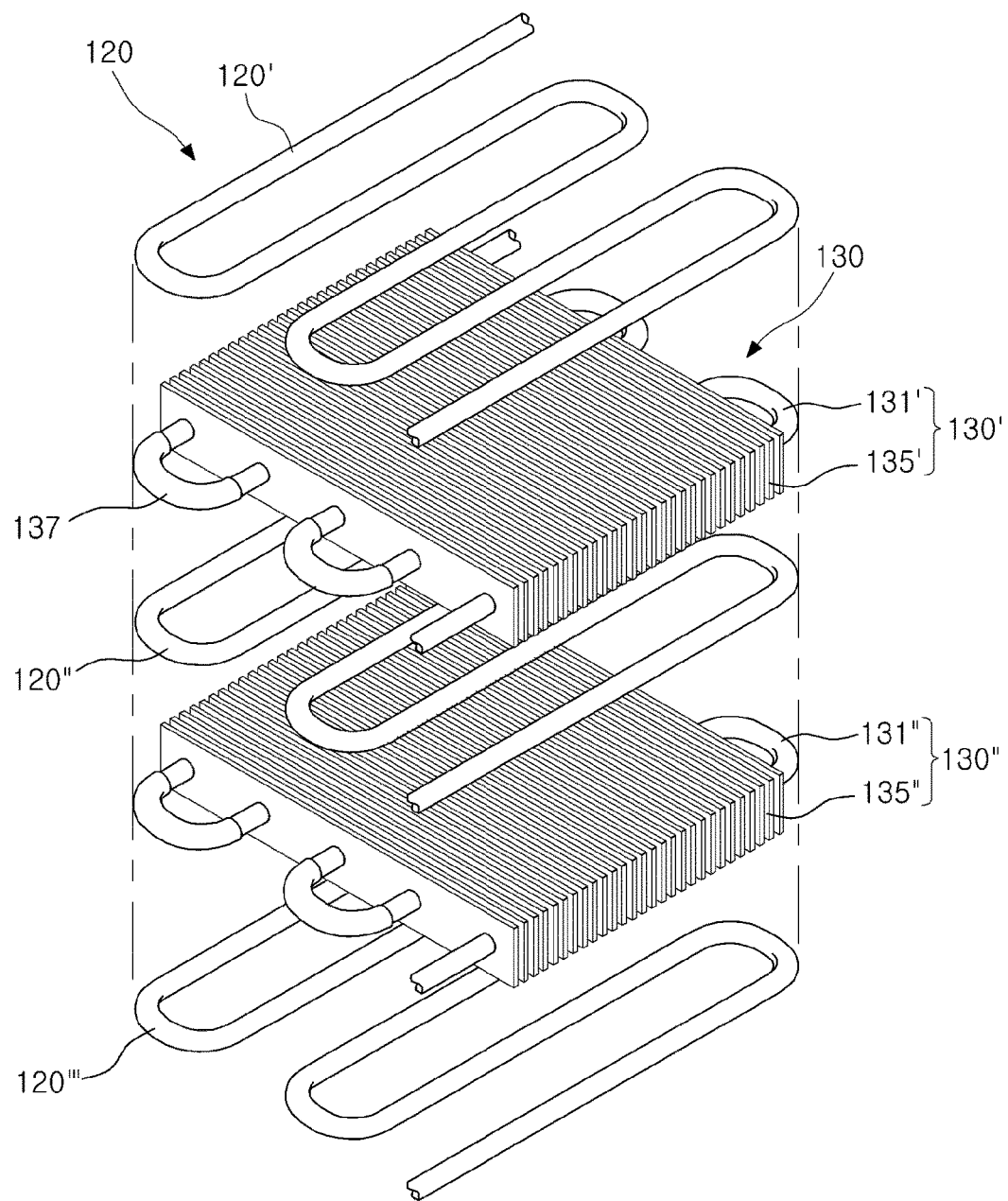

【Figure 26】
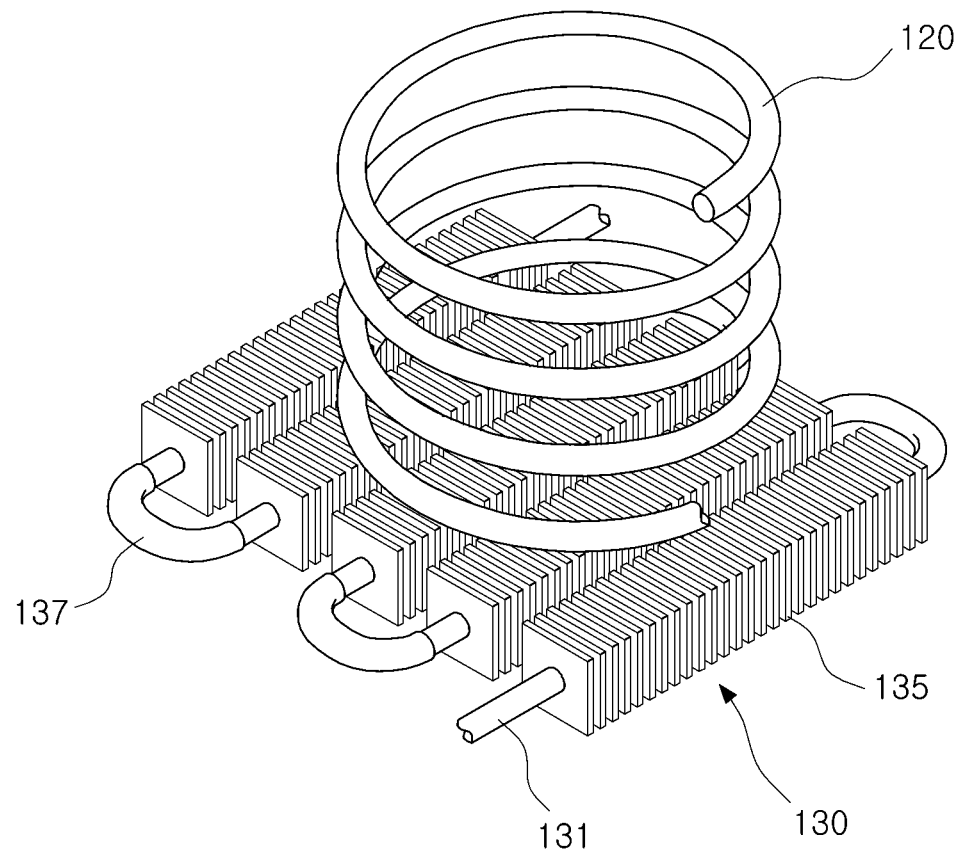

【Figure 27】
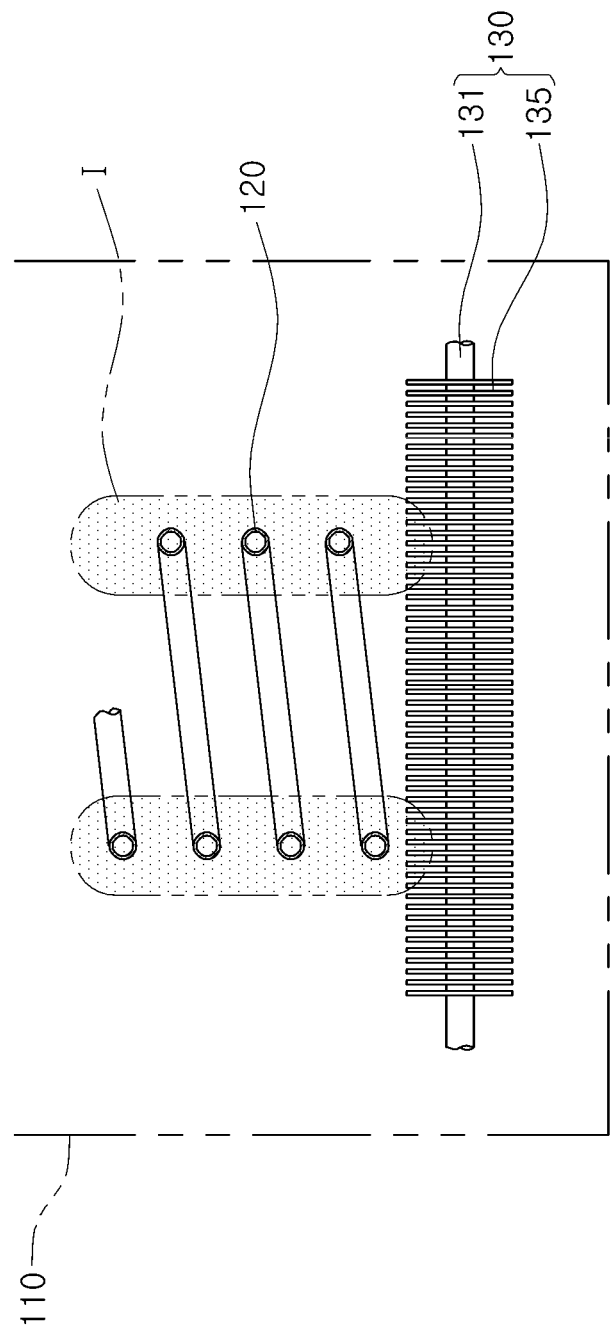

【Figure 28】
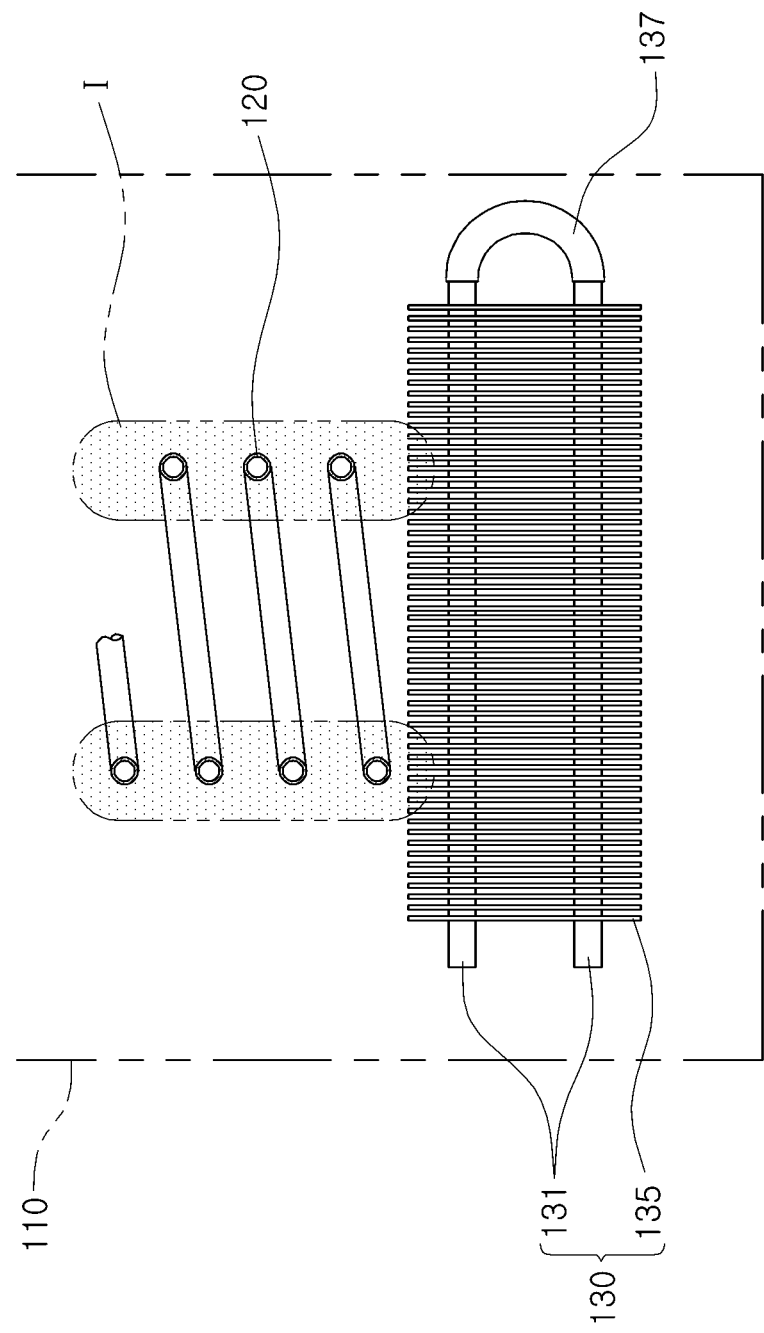

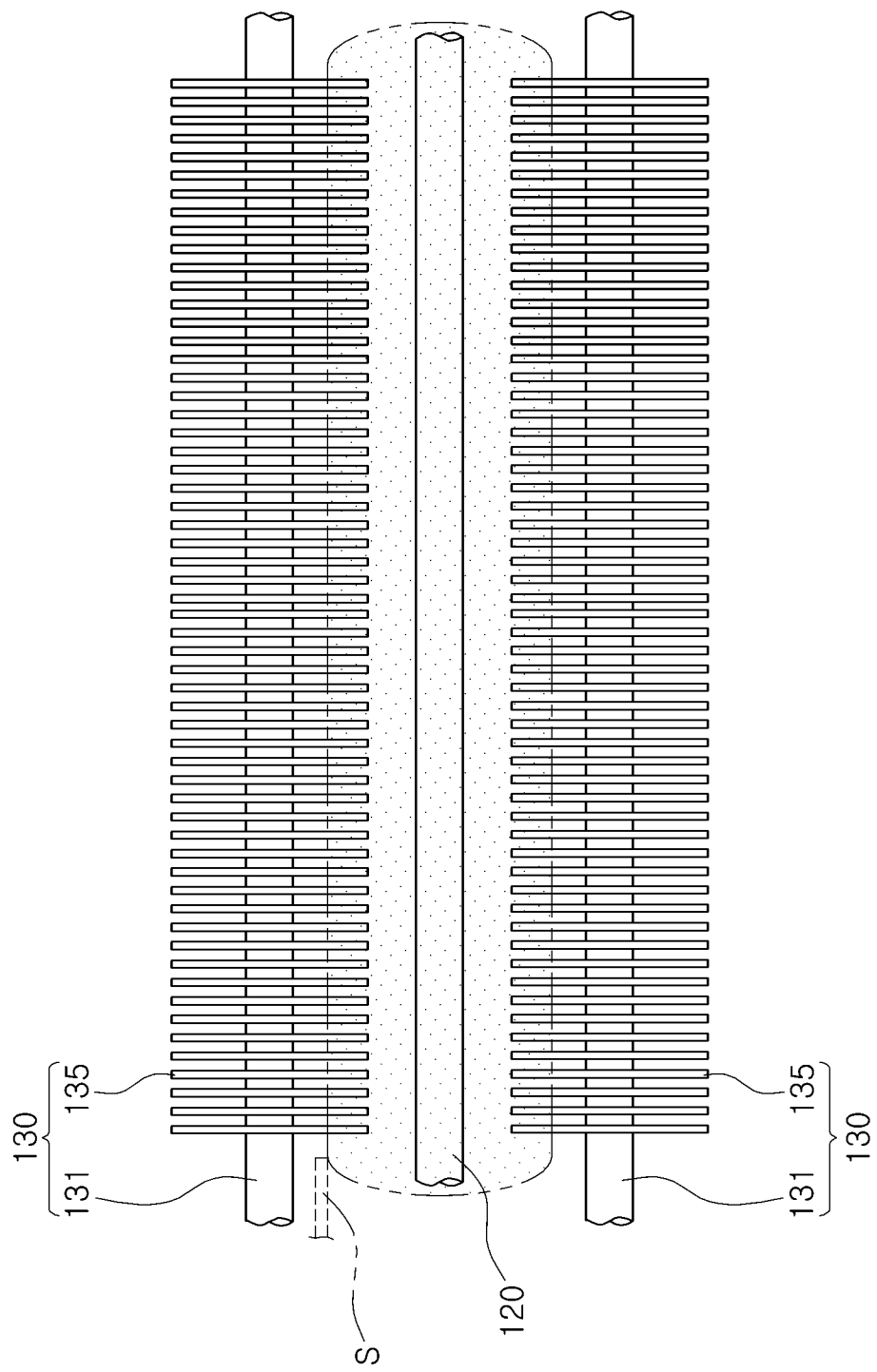
[Figure 29]

COLD-WATER GENERATING TANK, AND WATER COOLER EQUIPPED WITH SAME

PRIORITY

This application is a National Phase Entry of PCT International Application No. PCT/KR2015/013242, which was filed on Dec. 4, 2015, and claims priority to Korean Patent Application Nos. 10-2014-0174435 and 10-2014-0174436, which were each filed on Dec. 5, 2014, the contents of each of which are incorporated herein by reference.

TECHNICAL FIELD

The present disclosure relates to a cold water generating tank for generating cold water by heat exchange and a water cooler having the same, and more particularly, to a cold water generating tank for generating cold water using an ice thermal storage scheme and a water cooler having the same.

BACKGROUND ART

In general, a water cooler is a device for cooling water supplied from a faucet or a water dispenser and providing the water to a user. Such a water cooler may be mainly installed to cool drinking water in a water purifier, a water carbonator, a cold and hot water dispenser, and the like. However, the water cooler may be utilized in various fields requiring the generation of cold water.

A method for generating cold water includes a direct cooling method in which water accommodated in a cold water tank is directly cooled using the cold water tank, and an ice thermal storage method in which cold water is generated using heat exchange with ice or a cold fluid.

Here, in the ice thermal storage method, cold water is generated by heat exchange between a cold heat-transfer material accommodated in an ice storage tank and water flowing in a heat exchange tube (cold water pipe) installed in the ice storage tank.

In this regard, a normal ice storage (ice thermal storage) cooling system includes a ice storage tank accommodating an ice storage liquid, a refrigerant tube (cooling tube) connected to a cooling unit to cool or freeze the ice storage liquid, and a heat exchange tube generating cold water by heat exchange between water and the ice storage liquid having a temperature lowered by the refrigerant tube.

Ice is formed around the refrigerant tube to a certain thickness by a low-temperature refrigerant flowing in the refrigerant tube, and the temperature of the ice storage liquid is uniformly lowered since the ice storage liquid is circulated during the process. Meanwhile, when the temperature of the ice storage liquid reaches a predetermined value or lower, the operation of the cooling unit (compressor) connected to the refrigerant tube may be stopped.

When cold water is extracted, the water flowing in the heat exchange tube exchanges heat with the ice storage liquid to be cooled, and the ice storage liquid, whose temperature is raised due to the heat exchange, melts the ice formed around the refrigerant tube, thereby having a lowered temperature through latent heat.

During the heat exchange process, since the temperature of the ice storage liquid around the heat exchange tube is lowered due to the heat exchange, sufficient circulation of the ice storage liquid is required to smoothly generate cold water using the heat exchange tube.

However, even though the normal ice storage cooling system uses a circulation pump for circulation (convection) of the ice storage liquid, sufficient cooling efficiency may not be obtained due to the limitation in a structure in which the circulation of the ice storage liquid is insufficient.

PATENT DOCUMENT 1

Korean Unexamined Patent Publication No. 2013-0035888 (published Apr. 9, 2013)

DISCLOSURE

Technical Problem

An aspect of the present disclosure is to provide a cold water generating tank having a maximized cooling efficiency to extract a large amount of cold water, and a water cooler having the same.

An aspect of the present disclosure is to provide a cold water generating tank having a structure capable of maximizing cooling efficiency, and a water cooler having the same.

An aspect of the present disclosure is to provide a cold water generating tank having a structure capable of minimizing the occurrence of condensation caused by an ice storage liquid, and a water cooler having the same.

Technical Solution

According to an aspect of the present disclosure, a cold water generating tank includes a tank body accommodating an ice storage liquid cooled by a cooling unit, a cooling tube included in the tank body and configured to cool the ice storage liquid accommodated in the tank body, and a cold water generating unit including a heat exchange tube configured to form a flow path on which inflowing water becomes cold water by heat exchange with the ice storage liquid and an extension member located in an outer circumferential surface of the heat exchange tube and configured to increase a contact area with the ice storage liquid.

The cold water generating tank according to the exemplary embodiment of the prevent disclosure may further include a circulation unit configured to circulate the ice storage liquid accommodated in the tank body.

The cold water generating unit may be installed inside the tank body to surround a circumference of the cooling tube. In addition, the circulation unit may jet the ice storage liquid in a direction from the cooling tube toward the cold water generating unit.

In addition, the cooling tube may have a spiral shape, three-dimensionally, and the heat exchange tube may have a spiral shape, three-dimensionally, to surround the circumference of the cooling tube.

Here, a height of the heat exchange tube in a longitudinal direction may be greater than a diameter of the spiral formed by the cooling tube. For example, the height of the heat exchange tube in a longitudinal direction may be 1.5 to 10 times a diameter of the spiral formed by the cooling tube.

In addition, a difference between a diameter of the spiral formed by the heat exchange tube and the diameter of the spiral formed by the cooling tube may be 0.5 to 4 times the diameter of the spiral formed by the cooling tube.

In addition, the cooling tube and the heat exchange tube may have a shape in which a space is formed in each gap in the longitudinal direction.

In addition, the circulation unit may be configured to jet the ice storage liquid from a center portion of the spiral shape of the cooling tube such that the ice storage liquid flows to the cold water generating unit via the ice formed on the cooling tube.

Meanwhile, the circulation unit may include a jetting member arranged in the center portion of the spiral shape of the cooling tube in the longitudinal direction of the cooling tube and jetting the ice storage liquid to the cooling tube, and a pumping member configured to intake the ice storage liquid in the tank body to be supplied to the jetting member. The circulation unit may further include an intake member configured to supply the ice storage liquid in the tank body to the pumping member.

Here, the intake member may be disposed in a space between a circumference of the cold water generating unit and the tank body, and a plurality of intake members may be disposed on a circumference of the cold water generating unit at a predetermined interval.

Here, the jetting member may extend in the longitudinal direction of the cooling tube and include a plurality of injection holes.

In addition, the pumping member may be disposed inside the tank body to minimize the occurrence of condensation caused by the ice storage liquid flowing in the pumping member.

Meanwhile, the circulation unit may include a blocking member configured to restrict flow between the jetting member and the pumping member to prevent the ice storage liquid jetted from the jetting member from directly flowing into the pumping member. The blocking member may have a diameter greater than a diameter of the spiral formed by the cooling tube.

In addition, the cooling tube and the cold water generating unit may form circular spiral shapes and maintain a constant distance therebetween.

In addition, a pitch of the cooling tube may be the same as or a multiple of a pitch of the cold water generating unit, and the cold water generating unit may be disposed to correspond to a gap of the cooling tube.

In addition, the extension member provided in the cold water generating tank according to the exemplary embodiment of the prevent disclosure may have a shape protruding from the outer circumferential surface of the heat exchange tube, and consist of an ice contact member configured to be in contact with ice formed on the circumference of the cooling tube.

Here, the cold water generating unit may be installed inside the tank body to surround the circumference of the cooling tube, and the ice contact member may be in contact with the ice formed on the circumference of the cooling tube.

In addition, the cooling tube may form a spiral shape, three-dimensionally, and the heat exchange tube may form a spiral shape surrounding the circumference of the cooling tube. Here, the cooling tube and the cold water generating unit may have circular spiral shapes and maintain a constant distance therebetween.

In addition, a height of the heat exchange tube in the longitudinal direction may be greater than a diameter of the spiral formed by the cooling tube. Further, the height of the heat exchange tube in the longitudinal direction may be 1.5 to 10 times the diameter of the spiral formed by the cooling tube.

As another exemplary embodiment of the present disclosure, the cold water generating unit may include a first portion surrounding the circumference of the cooling tube and a second portion passing through an inside of the cooling tube, and the ice contact member may be in contact with the ice formed on the circumference of the cooling tube inside and outside of the cooling tube.

As another exemplary embodiment of the present disclosure, the cooling tube and the cold water generating unit may be layered and stacked in a vertical direction inside the tank body. Here, at least a portion of the ice contact member disposed in the cold water generating unit may be in contact with the ice formed on the cooling tube on both sides thereof.

As another exemplary embodiment of the present disclosure, the cooling tube may be disposed over the cold water generating unit, and the ice contact member of the cold water generating unit may be in contact with the ice formed on the cooling tube. Here, two or more layers of the cold water generating unit may be stacked under the cooling tube, and the ice contact member of the cold water generating unit may be connected to the two or more layers of the cold water generating unit.

Meanwhile, the extension member (ice contact member) of the cold water generating unit may include a plurality of fin members formed integrally with the outer circumferential surface of the heat exchange tube on a circumference of the heat exchange tube or installed on the outer circumferential surface of the heat exchange tube.

In addition, the heat exchange tube may have an integrally formed circular spiral shape, and the fin members may be disposed on the outer circumferential surface of the heat exchange tube at a predetermined interval.

Alternatively, the heat exchange tube may form an integrally-formed zigzag pattern, and the fin members may be disposed on the outer circumferential surface of the heat exchange tube at a predetermined interval.

As another exemplary embodiment of the present disclosure, the cold water generating unit may be formed by connecting a plurality of segmented heat exchange tube units including the heat exchange tube and the fin members. Here, the plurality of segmented heat exchange tube units may be connected by a connecting member connecting ends of the segmented heat exchange tube units. The connection member may consist of tubing formed of a flexible material.

In addition, the fin members may have a structure simultaneously connecting a plurality of heat exchange tubes.

In addition, the cold water generating unit may form a spiral shape, three-dimensionally, as a whole, by connecting the plurality of segmented heat exchange tube units.

In addition, the cold water generating unit may form a zigzag pattern as a whole by connecting the plurality of segmented heat exchange tube units.

In addition, the cold water generating unit may include a plurality of layers by arranging a unit layer over or under the cooling tube, wherein the unit layer may form a zigzag pattern as a whole by connecting the plurality of segmented heat exchange tube units.

Meanwhile, the fin members may have a rectangular, circular, or elliptical cross-section, and may be formed of a material including aluminum or stainless steel.

In addition, the fin members may have a structure in which a portion adjacent to the cooling tube has a width greater than a height and extends toward the cooling tube.

In addition, a portion of the ice contact member facing the cooling tube may have a length protruding from the outer circumferential surface of the heat exchange tube greater than an outer diameter of the heat exchange tube. Here, in the portion of the ice contact member facing the cooling tube, the length protruding from the outer circumferential surface of the heat exchange tube may be five times the outer diameter of the heat exchange tube or less.

In addition, the portion of the ice contact member facing the cooling tube may have a structure in which a length protruding from a center of the heat exchange tube is one third of a distance between centers of the cooling tube and the heat exchange tube or more.

In addition, the ice contact member may have a structure in which a width in a direction toward the cooling tube is greater than a width perpendicular to the direction toward the cooling tube.

According to another aspect of the present disclosure, a water cooler includes the cold water generating tank as described above, a cooling unit connected to the cooling tube to cool the ice storage liquid accommodated in the tank body; and a water outlet configured to be opened and closed to extract cold water generated in the cold water generating unit.

The cooling unit may form a cooling cycle including a compressor, a condenser, and an expander. The cooling tube may correspond to an evaporator of the cooling cycle.

In addition, the water cooler may further include a sensor unit configured to measure at least one of a temperature of the ice storage liquid accommodated in the tank body and a size of ice formed on the cooling tube, and a controller configured to control an operation of the cooling unit and/or the circulation unit using a value measured by the sensor unit.

The controller may control the circulation unit to circulate the ice storage liquid when a water output signal is input from the water outlet.

Meanwhile, the ice storage liquid accommodated in the tank body may be an aqueous solution having a freezing point lower than 0° C.

Advantageous Effects

As set forth above, according to an exemplary embodiment in the present disclosure, since an extension member (fin members) is installed on an outer circumferential surface of a heat exchange tube provided in a cold water generating unit, heat exchange efficiency between an ice storage liquid and water flowing in the heat exchange tube may be greatly improved.

In addition, according to an exemplary embodiment in the present disclosure, since the cold water generating unit is arranged to surround a cooling tube, and/or the ice storage liquid is jetted in a direction from the cooling tube toward the cold water generating unit, sufficient heat exchange with the cold water generating unit may be achieved by maximally utilizing latent heat of ice formed on the cooling tube.

In addition, according to an exemplary embodiment in the present disclosure, since an ice contact member (fin members) is installed on the outer circumferential surface of the heat exchange tube provided in the cold water generating unit and the ice contact member is in contact with the ice formed on the cooling tube, water flowing in the heat exchange tube may exchange heat with the ice formed around the cooling tube by conduction, thereby significantly increasing the heat exchange efficiency.

In addition, according to an exemplary embodiment in the present disclosure, since the cold water generating unit is arranged to surround the cooling tube and coldness of the ice formed around the cooling tube is transferred to the water flowing in the heat exchange tube by conduction, heat capacity of the ice storage liquid accommodated in a tank body may be sufficiently and efficiently utilized, thereby increasing efficiency of generating cold water.

In addition, according to an exemplary embodiment in the present disclosure, since heat transfer by direct conduction between the ice and the ice storage liquid is implemented, it is possible to reduce the total volume of the ice storage liquid. In addition, since it is possible to reduce a length of the heat exchange tube due to rapid heat exchange and high heat exchange efficiency, a reduction in a flow rate due to increase in length of the heat exchange tube may be minimized.

Further, according to an exemplary embodiment in the present disclosure, since cooling efficiency is maximized by utilizing various structure characteristics described in the specifications and claims, a large amount of cold water below a predetermined temperature may be extracted.

In addition, according to an exemplary embodiment in the present disclosure, since the heat exchange tube is arranged around the cooling tube, a diameter of a spiral formed by the heat exchange tube may increase. Accordingly, even when the heat exchange tube has the same length as a normal heat exchange tube, it is possible to reduce a thickness of the heat exchange tube, thereby increasing heat exchange efficiency between the water flowing in the heat exchange tube and ice storage liquid. The normal heat exchange tube may require a large angle for bending the heat exchange tube in order to secure a predetermined length or longer for the heat exchange tube in a predetermined internal space of the tank body. However, according to an exemplary embodiment in the present disclosure, the internal space of the tank body may be sufficiently utilized and the bending angle may be reduced since the diameter of a spiral formed by the heat exchange tube decreases. Accordingly, the heat exchange tube according to an exemplary embodiment in the present disclosure may be formed to be thin, compared to the normal heat exchange tube.

In addition, according to an exemplary embodiment in the present disclosure, since a pumping member is accommodated in the tank body, the occurrence of condensation on the pumping member may be prevented.

In addition, according to an exemplary embodiment in the present disclosure, cooling efficiency, based on the ice storage liquid having the same volume, may be further increased by using an aqueous solution having a freezing point lower than 0° C.

DESCRIPTION OF DRAWINGS

FIG. 1 is a schematic diagram illustrating a water cooler according to an exemplary embodiment of the present disclosure;

FIG. 2 is a cross-sectional view illustrating an example of a cold water generating tank illustrated in FIG. 1;

FIG. 3 is a perspective view, partly sectioned and exploded, of the cold water generating tank illustrated in FIG. 2;

FIG. 4 is a perspective view illustrating a structure of a cold water generating unit illustrated in FIG. 3;

FIG. 5 is a cross-sectional view illustrating a modified example of fin members:

FIG. 6 is a perspective view illustrating a cold water generating tank according to another exemplary embodiment of the present disclosure;

FIG. 7 is a plan view illustrating a structure of a cold water generating unit illustrated in FIG. 6;

FIGS. 8 to 10 are schematic diagrams illustrating structures of cold water generating units according to other exemplary embodiments of the present disclosure;

FIGS. 11 and 12 are cross-sectional views illustrating a function of a cold water generating tank according to an exemplary embodiment of the present disclosure, that is, FIG. 11 illustrates a state in which ice is formed on a cooling tube and FIG. 12 illustrates a circulation state of an ice storage liquid during extraction of cold water;

FIG. 13 is a graph illustrating a change in temperature of extracted water according to the number of extraction cups, illustrated to compare a cooling effect of the exemplary embodiment of the present disclosure with a normal product;

FIG. 14 is a graph illustrating a temperature relationship between a ice storage liquid and cold water while continuously extracting cold water from a cold water generating tank according to an exemplary embodiment of the present disclosure;

FIG. 15 is a schematic diagram illustrating a water cooler according to another exemplary embodiment of the present disclosure;

FIG. 16 is a cross-sectional view illustrating an example of a cold water generating tank illustrated in FIG. 15;

FIG. 17 is a perspective view, partly sectioned and exploded, of the cold water generating tank illustrated in FIG. 16;

FIG. 18 is a perspective view illustrating a structure of a cold water generating unit illustrated in FIG. 17;

FIG. 19 is a cross-sectional view of a modified example of the cold water generating tank illustrated in FIG. 16;

FIG. 20 is a perspective view illustrating a structure of a cold water generating unit and a cooling tube according to another exemplary embodiment of the present disclosure;

FIG. 21 is a schematic diagram illustrating a front view of the cold water generating unit and the cooling tube illustrated in FIG. 20;

FIG. 22 is a schematic plan view illustrating a combined structure of the cold water generating unit illustrated in FIG. 20;

FIG. 23 is a perspective view illustrating a modified example of the structure of the cold water generating unit and the cooling tube illustrated in FIG. 20;

FIG. 24 is a schematic diagram illustrating a front view of the cold water generating unit and the cooling tube illustrated in FIG. 23;

FIG. 25 is a perspective view illustrating another modified example of the structure of the cold water generating unit and the cooling tube illustrated in FIG. 20;

FIG. 26 is a perspective view illustrating a structure of a cold water generating unit and a cooling tube according to another exemplary embodiment of the present disclosure;

FIG. 27 is a schematic diagram illustrating a front view of the cold water generating unit and the cooling tube illustrated in FIG. 26;

FIG. 28 is a schematic diagram illustrating a modified example of the exemplary embodiment illustrated in FIG. 27; and FIG. 29 is a schematic diagram illustrated to explain a function of a cold water generating unit and a cooling tube according to an exemplary embodiment of the present disclosure.

MODES FOR CARRYING OUT THE INVENTION

Hereinafter, embodiments of the present inventive concept will be described as follows with reference to the attached drawings. The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the sizes and shapes of components may be exaggerated for clarity.

As used herein, the singular forms "a," "an," and "the" are intended to include the plural forms as well, unless the context clearly indicates otherwise.

In this specification, a water cooler 200 illustrated in FIGS. 1 to 29 according to exemplary embodiments of the present disclosure may be used in various water treatment apparatuses, such as a cold and hot water dispenser, a functional water generator for generating functional water such as carbonated water, as well as a general water purifier. Therefore, in addition to compositions such as a filter unit 210, and the like, which will be described later, a variety of compositions may be added depending on the purpose or performance of the water treatment apparatus. Further, it is obvious the water cooler 200 and a cold water generating tank 100 according to the exemplary embodiments of the present disclosure may be applied to a water treatment apparatus further including various components that are not illustrated in FIGS. 1 to 29.

Hereinafter, a water cooler 200 according to an exemplary embodiment of the present disclosure will be described with reference to FIGS. 1 to 14.

As illustrated in FIG. 1, the water cooler 200 according to the exemplary embodiment of the present disclosure may include a cold water generating tank 100 which generates cold water according to an ice thermal storage scheme, a cooling unit 220 for cooling an ice storage liquid accommodated in the cold water generating tank 100, and a water outlet 230 opened or closed to extract the cold water generated in a cold water generating unit 130. The water cooler 200 according to the exemplary embodiment of the present disclosure may further include a sensor unit 180 sensing a temperature, and the like of the ice storage liquid, and a controller C controlling an operation of the cooling unit 220 according to a value sensed by the sensor unit 180. Moreover, the water cooler 200 according to the exemplary embodiment of the present disclosure may further include a filter unit 210 in front of the cold water generating tank 100 in order to filter raw water.

First, the filter unit 210 may filter the raw water and supply the filtered water to users, and may include a plurality of or a combination of filters of various types according to specifications for the water treatment apparatus. However, since the filter unit 210 is not necessarily required in some water treatment apparatus such as a cold and hot water dispenser using natural water, the filter unit 210 may not be provided as an essential component of the water cooler 200 according to the exemplary embodiment of the present disclosure.

Next, the cooling unit 220 may form ice I around a cooling tube 120 by supercooling the ice storage liquid accommodated in a tank body 110 to a temperature below its freezing point. In this regard, the cooling unit 220 may include a compressor for compressing a refrigerant according to a general cooling cycle, a condenser for condensing the refrigerant compressed in the compressor, an evaporator for evaporating the refrigerant condensed in the condenser, and an expander for expanding the refrigerant evaporated in the evaporator. Here, the cooling tube 120 accommodated in the cold water generating tank 100 may correspond to an evaporator of a general cooling system. However, as long as the ice I is formed around the cooling tube 120 by cooling the ice storage liquid, as will be described later, a wellknown cooling device such as an electronic cooling device may be used as the cooling unit 220.

Meanwhile, although an inlet 121 and an outlet 122 of the cooling tube 120 are illustrated as passing through one side of the tank body 110 in order to be connected to the cooling unit 220 in FIG. 3 (which are the same in FIG. 17 to be described later), the path of cooling tube 120 may be modified in various ways. For example, as illustrated in FIG. 10, the inlet 121 and outlet 122 of the cooling tube 120 may be installed to pass through a bottom surface of the tank body 110. Here, the position of the outlet 122 of the cooling tube 120 is illustrated differently in FIG. 1 (which are the same in FIG. 15 to be described later) for ease of explanation of connection of the cooling unit 220 and the cooling tube 120.

In addition, the water outlet 230 may be provided to supply cold water to users. The water outlet 230 may include a shut-off valve (not shown) opened or closed according to user selection. Here, the shut-off valve may be an electronic valve operated by a user selecting a button or the like, or may be a mechanical valve. However, when the water outlet 230 includes the mechanical valve, a separate device providing a valve open signal or a valve close signal to the controller C may be required. Cold water discharged from the shut-off valve may be supplied to the user through a water outlet cock.

In addition, the sensor unit 180 may be provided to measure at least one of a temperature of the ice storage liquid accommodated in the tank body 110 and a size of the ice I formed around the cooling tube 120. The sensor unit 180 may include one sensor or two or more sensors in order to measure the temperature of the ice storage liquid at various points of the tank body 110 or separately measure the size (thickness) of the ice I formed around the cooling tube 120. For example, the temperature of the ice storage liquid may vary depending on a height of liquid in the inside of the tank body 120, due to a difference in density depending on the temperature, sensors for sensing the temperature of the ice storage liquid may be provided to correspond to different heights. In addition, the sensor unit 180 may be installed adjacently to the cooling tube 120 in order to sense the temperature at a point in direct contact with or adjacent to the ice I when the ice I is formed around the cooling tube 120.

Meanwhile, the controller C may be configured to control the driving of the cooling unit 220 and the circulation unit 140 using a value measured by the sensor unit 180.

That is, when the temperature of the ice storage liquid sensed by the sensor unit 180 is lower than a set temperature or the size (thickness) of the ice I formed around the cooling tube 120 is smaller than a set thickness, the controller C may drive the cooling unit 220 to lower the temperature of the ice storage liquid accommodated in the tank body 110 and to grow the ice I formed on an outer circumferential surface of the cooling tube 120.

Accordingly, when the temperature of the ice storage liquid reaches the set temperature or the size (thickness) of the ice I formed around the cooling tube 120 becomes equal to or larger than a certain thickness, the controller C may stop driving the cooling unit 220.

In addition, when a water output signal is input from the water outlet 230, the controller C may control a circulation unit 140 to circulate the ice storage liquid.

That is, when an open signal is input to the controller C from the shut-off valve (not shown) installed in the water outlet 230, the controller C may drive a pumping member 150 installed in the circulation unit 140 to circulate the ice storage liquid. In accordance with opening of the water outlet 230, the water flowing in the cold water generating unit 130 may be cooled by heat exchange with the ice storage liquid and supplied to a user through the water outlet cock. In this process, when the temperature sensed by the sensor unit 180 is lower than the set temperature or the size (thickness) of the ice I formed around the cooling tube 120 is smaller than the set thickness, the cooling unit 220 may be simultaneously driven. Meanwhile, when the user closes the shut-off valve, a close signal may be input to the controller C, and thereby, the controller C may stop driving the pumping member 150.

Meanwhile, the driving of the pumping member 150 may be stopped immediately after the close signal is input through the shut-off valve, or may be continued for a certain period of time so as to uniformize the temperature of the ice storage liquid. In addition, even when the close signal is input through the shut-off valve, the driving of the cooling unit 220 may be controlled to continue until the temperature of the ice storage liquid reaches the set value or the size of the ice I formed around the cooling tube 120 becomes equal to or larger than the certain thickness.

Next, a cold water generating tank 100 provided in a water cooler 200 according to an exemplary embodiment of the present disclosure will be described with reference to FIGS. 1 to 5.

As illustrated in FIGS. 1 to 3, the cold water generating tank 100 according to the exemplary embodiment of the present disclosure may include a tank body 110 having an internal space of a predetermined size and accommodating an ice storage liquid, a cooling tube 120 installed in the internal space of the tank body 110 to cool the ice storage liquid accommodated in the tank body 110, a cold water generating unit 130 in which inflowing water becomes cold water by heat exchange with the ice storage liquid, and a circulation unit 140 circulating the ice storage liquid accommodated in the tank body 110.

The tank body 110 may accommodate the ice storage liquid cooled by the cooling unit 220, and include a tank main body 111 forming a space thereinside and a tank cover 115 covering an opening of the tank main body 111. The tank body 110 may have a cylindrical shape as illustrated in FIG. 3, but is not limited thereto. The tank body 110 may have a hexahedral shape as illustrated in FIG. 6.

In addition, the cooling tube 120 may correspond to the evaporator of the above-described cooling unit 220. The cooling tube 120 may have a spiral shape, three-dimensionally and may be arranged to be elongated in a vertical direction inside the tank body 110, as illustrated in FIG. 3. Meanwhile, although the cooling tube 120 and a heat exchange tube 131 are described as being arranged to be elongated in a vertical direction based on drawings in the specification and claims, the cooling tube 120 and the heat exchange tube 131 may be arranged in a horizontal direction. In this regard, the vertical direction may have the same meaning as a longitudinal direction of the cooling tube 120 and the heat exchange tube 131 in the specification and claims.

A refrigerant may flow inside the cooling tube 120, and the ice storage liquid may be frozen to form ice I on an outer circumferential surface of the cooling tube 120 when the cooling unit 220 is operated.

A thickness of the ice I may be measured by the sensor unit 180 sensing a temperature of the ice storage liquid and/or being in contact with the ice I. When the ice I having a predetermined thickness is formed, the cooling unit 220 may be controlled to stop the operation thereof.

In addition, the cold water generating unit 130 may include the heat exchange tube 131 forming a flow path on which inflowing water becomes cold water by heat exchange with the ice storage liquid, and an extension member 135 located on an outer circumferential surface of the heat exchange tube 131 to increase a contact area with the ice storage liquid.

The heat exchange tube 131 may be arranged in the tank body 110 to surround a circumference of the cooling tube 120. That is, as illustrated in FIG. 3, the heat exchange tube 131 may be arranged around the cooling tube 120 having the spiral shape, three-dimensionally, to surround the circumference of the cooling tube 120.

Meanwhile, in FIG. 3, although a water inflow hole 131*a* and a water outflow hole 131*b* of the heat exchange tube 131 are illustrated as passing through one side of the tank body 110, a path of the heat exchange tube 131 may be variously modified. For example, a location of the water outflow hole 131*b* of the heat exchange tube 131 is illustrated differently in FIGS. 1 and 2 from that illustrated in FIG. 3, for ease of illustration.

The heat exchange tube 131 may have a spiral shape, three-dimensionally, like the cooling tube 120.

Meanwhile, 'the spiral shape, three-dimensionally' described in the specification and claims may include a shape in which the heat exchange tube 131 or the cooling tube 120 has a polygonal structure as a whole in a plan view illustrated in FIG. 6, as well as a shape in which the heat exchange tube 131 or the cooling tube 120 has a circular structure as a whole in a plan view illustrated in FIGS. 3 and 4. That is, 'the spiral shape, three-dimensionally' described in the specification and claims may refer to a shape continuously formed and wound, three-dimensionally, like a screw thread, regardless of whether the shape has the polygonal structure or the circular structure in a plan view.

Since the heat exchange tube 131 is arranged around the cooling tube 120, a diameter of a spiral (D2 in FIG. 11) formed by the heat exchange tube 131 may be greater than a diameter of a spiral (D1 in FIG. 11) formed by the cooling tube 120. Accordingly, the heat exchange tube 131 may have excellent workability and moldability.

For example, Korean Unexamined Patent Publication No. 2013-0035888 discloses that a heat exchange tube is bent at almost 180 degrees in order to install the heat exchange tube having a certain length (e.g. 5 meters) or longer in a narrow internal space of a tank body. In this case, since bursting may occur in a bend due to a large bending angle, a thickness of the heat exchange tube is increased (approximately 0.7 mm for a SUS material). However, according to the exemplary embodiment of the present disclosure, since the heat exchange tube 131 is arranged around the cooling tube 120, the diameter (D2 in FIG. 11) of the spiral formed by the heat exchange tube 131 may increase and thereby the thickness of the heat exchange tube 131 may decrease (reduced to approximately 0.2 to 0.3 mm for a SUS material). Likewise, when the thickness of the heat exchange tube 131 decreases, heat exchange efficiency between the water flowing in the heat exchange tube 131 and the ice storage liquid may increase and cooling efficiency (efficiency of generating cold water) may also increase.

In addition, Korean Unexamined Patent Publication No. 2013-0035888 discloses a structure in which a cooling tube is disposed over a tank body and the heat exchange tube is disposed under the tank body. In this case, since the density of tubes is high at a lower portion of the tank body but low at an upper portion of the tank body, space utilization efficiency of the ice storage liquid is lowered and efficient use of the ice storage liquid is difficult. However, according to the exemplary embodiment of the present disclosure, since the heat exchange tube 131 is disposed around the cooling tube 120, the density of tubes may be uniform at both upper and lower portions of the tank body 110. Accordingly, not only the space utilization efficiency of the ice storage liquid may increase, but also the ice storage liquid may be efficiently used at both upper and lower portions of the tank body 110. That is, since the distance between the heat exchange tube 131 and the cooling tube 120 is uniform throughout the total length of the heat exchange tube 131, the ice I formed on the outer circumferential surface of the cooling tube 120 having a relatively low temperature and the ice storage liquid having a low temperature around the cooling tube 120 may be efficiently used. In particular, since the heat exchange tube 131 disclosed in Korean Unexamined Patent Publication No. 2013-0035888 has a dense structure, flowing or mixing of the ice storage liquid is insufficient resulting in unevenness of the temperature of the ice storage liquid. However, according to the exemplary embodiment of the present disclosure, since the cooling tube 120 and the heat exchange tube 131 are arranged to be adjacent to each other as a whole, cooling efficiency may be improved.

Meanwhile, as will be described later, the circulation unit 140 may have a structure in which the ice storage liquid is jetted in a direction from the cooling tube 120 toward the cold water generating unit 130, that is, in an outward direction from a center of the tank body 110.

Accordingly, since the ice storage liquid moves toward the cold water generating unit 130 to exchange heat with water flowing in the heat exchange tube 131 when the temperature of the ice storage liquid is lowered due to melting of the ice I formed around the cooling tube 120, cold water generating efficiency may be greatly improved.

In particular, when a pitch of the cooling tube 120 and the heat exchange tube 131 (a center distance between adjacent tubes) is adjusted to form a predetermined space between the tubes, a space may be formed in a gap of the cooling tube 120 in the longitudinal direction. In addition, a space through which the ice storage liquid flows may be formed in a gap of the heat exchange tube 131 in the longitudinal direction. Accordingly, the ice storage liquid cooled during flowing around the cooling tube 120 may easily reach the heat exchange tube 131 through the space formed in the gap of the cooling tube 120. In addition, the ice storage liquid reaching the heat exchange tube 131 may also move in an inward direction of the tank body 110 through the space formed in the gap of the heat exchange tube 131 after exchanging heat. Since such a flow is performed uniformly over the entire length from a top to a bottom of the cooling tube 120 and the heat exchange tube 131, the cooling efficiency may be uniform over the entire length of the heat exchange tube 131 and sufficient cooling may be achieved.

In this regard, the pitch of the cooling tube 120 may be 1.2 to 5 times the outer diameter of the cooling tube 120 so as to form the space in the gap of the cooling tube 120 in the longitudinal direction. Here, when the pitch of the cooling tube 120 is smaller than 1.2 times the outer diameter of the cooling tube 120, the size of the space formed in the gap of the cooling tube 120 may be smaller than 0.2 times the outer diameter of the cooling tube 120, thereby significantly increasing resistance during passing of the ice storage liquid. In addition, when the pitch of the cooling tube 120 is greater than the outer diameter of the cooling tube 120 by 5 times, the size of the space formed in the gap of the cooling tube 120 may be greater than the outer diameter of the cooling tube 120 by 4 times, thereby not only decreasing space efficiency but also shortening the length of the cooling tube 120 in a predetermined volume. Accordingly, heat exchange may not be performed.

In addition, the pitch of the cooling tube 120 and the pitch of the cold water generating unit 130 may be the same or have a multiple relationship and, in this case, the cold water generating unit 130 may be arranged to correspond to the space formed in the gap of the cooling tube 120. That is, as illustrated in FIG. 2, when the heat exchange tube 131 of the cold water generating unit 130 is arranged to correspond to the space formed in the gap of cooling tube 120, the ice storage liquid may easily pass through the space formed in the gap of cooling tube 120 to reach the heat exchange tube 131. In order to form such a staggered arrangement, the pitch of the cooling tube 120 and the pitch of the cold water generating unit 130 may be the same or have a multiple relationship. However, even when the pitch of the cooling tube 120 is different from the pitch of the cold water generating unit 130, the motion of the ice storage liquid may not be limited since the space is formed in the gap of the cooling tube 120 and in the gap of the heat exchange tube 131 of the cold water generating unit 130. Accordingly, the present inventive concept may not be limited to the structure having the pitch scheme described above.

In addition, as illustrated in FIGS. 2 and 3, the cooling tube 120 and the heat exchange tube 131 of the cold water generating unit 130 may be configured to have a uniform distance in a width direction (or a diameter direction), and thereby the cooling efficiency may be uniform over the entire length from the top to the bottom of the cooling tube 120 and the heat exchange tube 131.

Meanwhile, a height (H in FIG. 11) of the heat exchange tube 131 in the longitudinal direction may be set to be greater than a diameter (D1 in FIG. 11) of the spiral formed by the cooling tube 120. Therefore, an internal space of the cooling tube 120 may be reduced, and the heat exchange tube 131 may be in sufficient contact with the ice storage liquid flowing through the cooling tube 120.

Here, the height H in FIG. 11 of the heat exchange tube 131 in the longitudinal direction may be 1.5 to 10 times, preferably 1.5 to 5 times, the diameter (D1 in FIG. 11) of the spiral formed by the cooling tube 120. When the longitudinal height H of the heat exchange tube 131 is smaller than the diameter D1 of the spiral formed by the cooling tube 120, the diameter D1 of the spiral formed by the cooling tube 120 may become relatively large. Accordingly, the internal space of the cooling tube 120 may not be efficiently utilized. On the other hand, when the longitudinal height H of the heat exchange tube 131 is greater than the diameter D1 of the spiral formed by the cooling tube 120 by 10 times, the length of the tank body 110 may become excessively large thereby limiting installation of the tank body 110 in the water cooler 200, and the diameter D1 of the spiral formed by the cooling tube 120 may become excessively small thereby limiting molding of the cooling tube 120.

In addition, the heat exchange tube 131 and the cooling tube 120 may preferably be arranged to be adjacent to each other so that the ice storage liquid sufficiently cooled by being in contact with the ice I while passing through the space between gaps of the cooling tube 120 exchanges heat with the water flowing in the heat exchange tube 131 without being affected by the surrounding ice storage liquid. In this regard, the difference (2*L in FIG. 11) between the diameter D2 of the spiral formed by the heat exchange tube 131 and the diameter D1 of the spiral formed by the cooling tube 120 may preferably be 0.5 to 4 times the diameter D1 of the spiral formed by the cooling tube 120. When the difference 2*L of the diameters D1 and D2 is smaller than 0.5 times the diameter D1 of the spiral formed by the cooling tube 120, the cooling tube 120 and the heat exchange tube 131 may be extremely close to each other, and the ice I formed on the outer circumferential surface of the cooling tube 120 may extend to the heat exchange tube 131. Accordingly, water flowing in the heat exchange tube 131 may freeze and the heat exchange tube 131 may be frozen and burst. On the other hand, when the difference 2*L of the diameters D1 and D2 is greater than 4 times the diameter D1 of the spiral formed by the cooling tube 120, the cooling tube 120 and the heat exchange tube 131 may be extremely close to each other, a distance (L in FIG. 11) between tube centers of the heat exchange tube 131 and the cooling tube 120 may become twice or more than the diameter D1 of the spiral formed by the cooling tube 120. Therefore, an excessively large space may be formed between the heat exchange tube 131 and the cooling tube 120, and space utilization may not be efficient. Furthermore, since the ice storage liquid cooled due to contact with the ice I during passing through the space formed in the gap of the cooling tube 120 and heated again by heat exchange with surrounding ice storage liquid reaches the heat exchange tube 131, sufficient cooling efficiency may not be obtained.

Meanwhile, the extension member 135 of the cold water generating unit 130 may include a plurality of fin members which are integrally formed with the outer circumferential surface of the heat exchange tube 131 around the heat exchange tube 131 or installed on the outer circumferential surface of the heat exchange tube 131 (hereinafter, the extension member and the fin members will be denoted by a reference numeral 135). As illustrated in FIG. 4, the fin members 135 may be arranged on the outer circumferential surface of the heat exchange tube 131 having a spiral shape, at predetermined intervals. Meanwhile, although the fin members 135 are schematically illustrated as being in contact with each other in FIGS. 3 and 4, predetermined intervals may be formed between the fin members 135 so that the ice storage liquid can be in contact with the heat exchange tube 131 through spaces between the fin members 135, as illustrated in an enlarged view of FIG. 4. Here, the fin members 135 may be arranged to have the predetermined intervals, but are not limited thereto. In addition, the fin members 135 may be installed at the entire area of the heat exchange tube 131 adjacent to the cooling tube 120, but are not limited thereto. When a plurality of segmented heat exchange tube units 130u are connected to each other through a connection member 137, the fin members 135 may be installed at a portion of the heat exchange tube 131 as illustrated in FIGS. 6 and 7.

Such fin members 135 may have a polygonal (rectangular) cross-section as illustrated in FIG. 5(a), or a circular cross-section as illustrated in FIG. 5(b). In addition, as illustrated in FIG. 8, the fin members 135 may have a rectangular shape having a width greater than a height, and a structure in which only a width of a portion facing the cooling tube 120 with respect to the heat exchange tube 131 is elongated.

The fin members 135 may be formed of a material including aluminum or stainless steel (SUS). That is, the fin members 135 may be formed of stainless steel, which is the same material as the heat exchange tube 131, or aluminum to increase heat exchange efficiency. In addition, anti-corrosion coating may be performed on the heat exchange tube 131 to prevent corrosion thereof.

Next, the circulation unit 140 will be described.

As described above, the circulation unit 140 may jet the ice storage liquid from a center of the spiral of the cooling tube 120 to flow the ice storage liquid to the cold water generating unit 130 passing by the ice I formed on the cooling tube 120.

In this regard, the circulation unit 140 may include a jetting member 160 arranged in a center portion of the spiral shape of the cooling tube 120 in a longitudinal direction of the cooling tube 120 and jetting the ice storage liquid toward the cooling tube 120, and a pumping member 150 intaking the ice storage liquid in the tank body 110 to supply the ice storage liquid to the jetting member 160. The circulation unit 140 may additionally include an intake member 141 supplying the ice storage liquid in the tank body 110 to the pumping member 150.

The jetting member 160 may extend in the longitudinal direction (vertical direction) of the cooling tube 120 and have a plurality of injection holes 161. Here, the plurality of injection holes 161 may be formed in a longitudinal direction of the jetting member 160 as illustrated in FIGS. 2 and 3. Accordingly, the ice storage liquid may be jetted over the entire portion in the longitudinal direction of the cooling tube 120 through jetting member 160.

In addition, the pumping member 150 may consist of an intaking and/or pressurizing device such as a pump. Here, the pumping member 150 may be installed in the tank body 110 to minimize the occurrence of condensation thereon by the ice storage liquid flowing in the pumping member 150. That is, when the pumping member 150 is installed outside the tank body 110, condensation may occur on an external surface of the pumping member 150 due to a difference in temperature from the outside air. Water drops due to condensation may cause electric shocks and short circuits. However, according to the exemplary embodiment of the present disclosure, the occurrence of condensation may be fundamentally blocked by installing the pumping member 150 inside the tank body 110. The pumping member 150 may use a submerged pump that can be operated in a state of being immersed in the ice storage liquid.

Meanwhile, a plurality of intake members 141 may be arranged at a predetermined interval on the circumference of the cold water generating unit 130. That is, the intake members 141 may preferably be arranged in a space between the cold water generating unit 130 and the tank body 110 so as to resupply the ice storage liquid, which is jetted from the jetting member 160, then cooled during passing through the cooling tube 120, and then heated by heat exchange with the heat exchange tube 131, to the pumping member 150. In addition, since the plurality of intake members 141 are arranged at the predetermined interval on the circumference of the cold water generating unit 130, the ice storage liquid may be intaken from the entire space between the cold water generating unit 130 and the tank body 110. Although four intake members 141 are arranged to be spaced apart from each other at the predetermined interval in FIG. 3, the number of the intake members 141 may not be limited thereto. In addition, as illustrated in FIG. 2, inlets of the intake members 141 may extend to a lower portion of the tank body 110, but the locations of the inlets are not limited thereto. Further, the inlets of at least a portion of the intake members 141 may be disposed at different heights.

As illustrated in FIGS. 2 and 3, the plurality of intake members 141 may be connected to the pumping member 150, through a manifold 143 connecting the intake members 141 each other and a supply tube 142 in order. Meanwhile, although the intake members 141 are illustrated as passing through the tank cover 115 in FIGS. 2 and 3, the intake members 141 may pass through the tank main body 111 or may be connected to the pumping member 150 inside the tank body 110.

Next, a cold water generating tank 100 according to another exemplary embodiment of the present disclosure will be described with reference to FIGS. 6 and 7.

The cold water generating tank 100 illustrated in FIGS. 6 and 7, like the cold water generating tank 100 illustrated in FIGS. 2 to 4, may include a tank body 110 accommodating an ice storage liquid in a predetermined size of space thereinside, a cooling tube 120 installed in the tank body 110 to cool the ice storage liquid accommodated in the tank body 110, a cold water generating unit 130 in which inflowing water becomes cold water by heat exchange with the ice storage liquid, and a circulation unit 140 circulating the ice storage liquid accommodated in the tank body 110.

However, the cold water generating unit 130 of the cold water generating tank 100 illustrated in FIGS. 6 and 7 has a different structure and shape from that illustrated in FIGS. 2 to 4, and accordingly the tank body 110 has a hexahedral shape. Accordingly, detailed descriptions of the same or a similar configuration will be omitted to avoid duplicate description, and a different configuration of the cold water generating unit 130 will be described.

As illustrated in FIGS. 6 and 7, the cold water generating unit 130 may include a heat exchange tube 131 forming a flow path on which inflowing water becomes cold water by heat exchange with the ice storage liquid, and an extension member (fin members) 135 located on an outer circumferential surface of the heat exchange tube 131 to increase a contact area with the ice storage liquid. The heat exchange tube 131 may be arranged in the tank body 110 in a manner surrounding a circumference of the cooling tube 120. That is, as illustrated in FIGS. 6 and 7, the heat exchange tube 131 may be arranged around the cooling tube 120 having a spiral shape, three-dimensionally in the manner surrounding the circumference of the cooling tube 120.

Here, the cold water generating unit 130 may have a structure in which a plurality of segmented heat exchange tube units 130u including the heat exchange tube 131 and the fin members 135 are connected each other, for ease of manufacturing.

As illustrated in FIG. 7, the segmented heat exchange tube units 130u may have a structure in which the fin members 135 are arranged on an outer circumferential surface of a segmented heat exchange tube 131u. Although the segmented heat exchange tube 131u is illustrated as having a linear shape in FIG. 7, it may also have an arc shape.

Here, the plurality of segmented heat exchange tube units 130u may be connected by a connection member 137 connecting ends of the segmented heat exchange tubes 131u to each other. Such a connection member 137 may consist of, for example, tubing formed of a flexible material, but is not limited thereto. That is, a metallic connecting pipe may be attached to an end of the segmented heat exchange tube 131u by welding or the like.

In addition, a clamping member 138 may be used to tightly attach the connection member 137 to the end of the segmented heat exchange tube unit 131u.

The segmented heat exchange tube units 130u may be connected to each other by the connection member 137 and stacked. Accordingly, the cold water generating unit 130 may form the spiral shape, three-dimensionally, as illustrated in FIG. 6. That is, the cold water generating unit 130 may be configured to form the spiral shape, three-dimensionally, as illustrated in FIG. 6 by stacking the segmented heat exchange tube units 130*u* having a basically rectangular shape as illustrated in a plan view of FIG. 7. In order to accommodate the cold water generating unit 130, the tank body 110 may also have a hexahedral structure.

In addition, an intake member 141 may be located at four corners of the tank body 110, as illustrated in FIG. 6.

Next, a cold water generating tank 100 according to another exemplary embodiment of the present disclosure will be described with reference to FIG. 8.

The cold water generating tank 100 illustrated in FIG. 8 may have a structure in which fin members 135 extends toward a cooling tube 120 compared to those illustrated in FIG. 2 and thereby ice I formed on a circumferential surface of the cooling tube 120 extends to the fin members 135. That is, the fin members 135 may have a structure in which a length (width) of a portion adjacent to the cooling tube 120 is greater than a height of the fin members 135. Accordingly, the fin members 135 may have a structure in which the length in a direction toward the cooling tube 120 is longer than the height in a direction perpendicular to the cooling tube 120.

In this manner, when the ice I formed on a circumferential surface of the cooling tube 120 extends to the fin members 135, the coldness of the ice I may be transferred to the fin members 135 by direct conduction. Accordingly, heat of water flowing in a heat exchange tube 131 may be transferred to the ice I formed on the fin members 135 through the heat exchange tube 131 and the fin members 135 by conduction. Accordingly, cold water generation efficiency may be further increased.

Here, when the ice I is generated extending to the heat exchange tube 131, water flowing in the heat exchange tube 131 may freeze and the heat exchange tube 131 may be frozen and burst. In order to prevent this, the fin members 135 may preferably have a structure in which portions adjacent to the cooling tube 120 extend toward the cooling tube 120 and thereby the heat exchange tube 131 is spaced apart from the cooling tube 120. Although the fin members 135 illustrated in FIG. 8, compared to those illustrated in FIG. 2, have a structure in which a length (width) of portions adjacent to the cooling tube 120 is longer than a length (width) of the opposite portions, both portions of the fin members 135 may extend in the width direction.

Next, a cold water generating tank 100 according to another exemplary embodiment of the present disclosure will be described with reference to FIGS. 9 and 10.

The cold water generating tank 100 illustrated in FIG. 9 may be different from the cold water generating tank 100 illustrated in FIGS. 2 to 4, in that a blocking member 190 is installed in a circulation unit 140 and a intake member 155 does not extend to a lower portion of a tank body 110.

The blocking member 190 may limit a flow between a jetting member 160 and a pumping member 150 so as to prevent the ice storage liquid jetted from the jetting member 160 from directly inflowing to the pumping member 150.

That is, when a length of the intake member 155 is short or when the pumping member 150 has an inlet 151 and no intake member 155, the ice storage liquid jetted from the jetting member 160 may reflow into the pumping member 150 without being circulated or mixed sufficiently in the tank body 110. In this case, temperature may become uneven in the tank body 110, thereby reducing the cold water generation efficiency of a cold water generating unit 130. Accordingly, the ice storage liquid jetted from the pumping member 150 may need to be intaken into the pumping member 150 after passing through the cooling tube 120. In this regard, a diameter of the blocking member 190 may be greater than a diameter (D1 in FIG. 11) of a spiral formed by the cooling tube 120. In addition, when the ice storage liquid jetted from the pumping member 150 flows back into the pumping member 150 after passing through the cooling tube 120 and a heat exchange tube 131, the circulation efficiency may be further improved. Therefore, the diameter of the blocking member 190 may be similar to or greater than the diameter (D1 in FIG. 11) of the spiral formed by the cold water generating unit 130. Here, the blocking member 190 may not be limited to a circular shape. The blocking member 190 may have a rectangular shape. When the shape of the blocking member 190 is not circular, the diameter of the blocking member 190 is based on a length of a short side thereof.

In addition, although the intake member 155 is illustrated as being attached to the inlet 151 of the pumping member 150 in FIG. 9, the intake member 155 may not be essential when the blocking member 190 is installed. In addition, even when the blocking member 190 is installed, the intake member 155 may have a structure extending to a lower portion of the tank body 110 to some extent, as illustrated in FIG. 2.

Meanwhile, a structure of the cold water generating tank 100 including the blocking member 190 illustrated in FIG. 9 is illustrated in FIG. 10. Here, the circulation unit 140 including the pumping member 150 may be installed in the lower portion of the tank body 110. That is, although the circulation unit 140 is installed in an upper portion of the tank body 110 according to the exemplary embodiment illustrated in FIGS. 2 to 9, the blocking member 190, the pumping member 150, and the like, which consist the circulation unit 140, may be installed in the lower portion of the tank body 110 when the pumping member 150 uses a submerged motor as illustrated in FIG. 10. In addition, although the inlet 121 and outlet 122 of the cooling tube 120 are disposed at a bottom of the tank body 110 as illustrated in FIG. 10, the location of the inlet 121 and outlet 122 of the cooling tube 120 connected to the tank body 110 may not be limited thereto as described above.

Meanwhile, the ice storage liquid accommodated in the tank body 110 may utilize water having a freezing point of 0° C., or an aqueous solution having a freezing point lower than 0° C. to increase heat capacity (heat content) of the ice storage liquid.

Here, the ice storage liquid may preferably be formed of a material which is less harmful to human body and which does not cause corrosion of the cooling tube 120 or the heat exchange tube 131.

In this regard, propylene glycol, used as an extender and humectant of bread and an extender of shortening, and approved as a solvent for food by United States Food and Drug Administration (FDA), may be formed in aqueous solution and used as the ice storage liquid. Accordingly, not only the overall heat capacity (heat content) of the tank body 110 may be increased, but also damage to the human body may be minimized.

In addition, since the aqueous propylene glycol solution is not corrosive, corrosion of the tank body 110 or a metallic tube installed therein may be inhibited.

Here, a temperature of freezing point depression of the ice storage liquid may be controlled by adjusting the amount of propylene glycol used to form the aqueous propylene glycol solution.

However, the ice storage liquid according to the exemplary example of the present disclosure may not be limited to the above described water or aqueous propylene glycol solution, and various types of aqueous solutions such as sugar water may be used.

Next, a process of generating cold water using a water cooler 200 and a cold water generating tank 100 according to an exemplary embodiment of the present disclosure will be described with reference to FIG. 1 and FIGS. 11 to 14.

Referring to FIGS. 1 and 11, when a temperature of the ice storage liquid sensed by the sensor unit 180 is lower than a set temperature or a size (thickness) of the ice I formed on the cooling tube 120 is smaller than a set thickness, the controller C may drive the cooling unit 220 to lower the temperature of the ice storage liquid accommodated in the tank body 110 and grow the ice I formed on an outer circumferential surface of the cooling tube 120.

Accordingly, as illustrated in FIG. 11, a predetermined size (thickness) of the ice I may be formed on the outer circumferential surface of the cooling tube 120. When the temperature of the ice storage liquid reaches the set temperature, or the size of the ice I formed on the cooling tube 120 becomes a predetermined size or more, the controller C may stop driving the cooling unit 220.

Meanwhile, when a user operates the water outlet 230 to open the shut-off valve, an open signal of the shut-off valve may be transferred to the controller C, and the controller C may drive the pumping member 150 of the circulation unit 140 to generate cold water.

When the ice storage liquid is jetted through the injection holes 161 of the jetting member 160 by the pumping member 150, the ice storage liquid may come into contact with the ice I formed around the cooling tube 120. Accordingly, since the ice I formed around the cooling tube 120 melts, a space through which the ice storage liquid flows may be formed in a gap of the cooling tube 120. Although the ice I formed around the cooling tube 120 is illustrated as being integrally formed to have a constant thickness throughout the cooling tube 120 in FIG. 11, the shape of the ice I formed around the cooling tube 120 may vary depending on a pitch of the cooling tube 120 or a controlled size (thickness) of the ice I. In addition, even when the pipe-shaped ice I is formed on the cooling tube 120, the space through which the ice storage liquid flows may be formed between the ice I after the ice is partially removed by jetting of the ice storage liquid.

As illustrated in FIG. 12, when the jetted ice storage liquid comes into contact with the ice I formed on the cooling tube 120, the space between the ice I may be gradually widen and the cooled ice storage liquid may exchange heat with water flowing in the cold water generating unit 130. Here, since the fin members 135 are installed in the cold water generating unit 130, an area in contact with the ice storage liquid may be increased, resulting in smoother heat exchange between the ice storage liquid and the water flowing in the heat exchange tube 131. Experimental results show that the heat exchange efficiency obtained when the fin members 135 are installed around the heat exchange tube 131 increases by about 2.5 times or more than that obtained when the fin members 135 are not installed around the heat exchange tube 131.

In addition, as described above, when the thickness of the heat exchange tube 131 is reduced, the heat exchange efficiency (cold water generation efficiency) may be further increased.

In addition, since the cold water generating unit 130 has a spiral shape, three-dimensionally, a space may be formed between the fin members 135, as well as in the gap of the heat exchange tube 131. Accordingly, the ice storage liquid flowing from the cooling unit 220 to the cold water generating unit 130 may easily move to a space between cold water generating unit 130 and the tank body 110 through the space formed in the cold water generating unit 130.

Then, the ice storage liquid may be intaken by the intake member 141 (155 in FIGS. 9 and 10) installed in the space between the cold water generating unit 130 and the tank body 110, to be supplied again to the jetting member 160 by the pumping member 150. Accordingly, a flow path, in which the ice storage liquid moves from a center portion of the tank body 110 to an inner circumferential surface of the tank body 110 (radially outwardly) and moves back to the center portion of the tank body 110 by the pumping member 150, may be formed. In particular, since the jetting member 160, the cooling tube 120, and the cold water generating unit 130 are longitudinally installed in a vertical direction, circulation and mixing of the ice storage liquid may be easily performed over the entire upper and lower portions of the tank body 110, resulting in uniform distribution of the temperature of the ice storage liquid. Meanwhile, in FIGS. 9 and 10, since the ice storage liquid jetted from the jetting member 160 is intaken into the pumping member 150 by blocking member 190 after passing through the cooling tube 120 and/or the cold water generating unit 130, the circulation scheme described above may be maintained.

Meanwhile, in the process of generating cold water, the cooling unit 220 may be simultaneously operated when a temperature sensed by the sensor unit 180 is lower than the set temperature or the size (thickness) of the ice I formed on the cooling tube 120 is smaller than the set thickness. In addition, when a user closes the shut-off valve, a close signal is input to the controller C, and accordingly the controller C may stop driving the pumping member 150 immediately or after a predetermined time.

In this manner, the water flowing in the heat exchange tube 131 may sufficiently exchange heat with the ice storage liquid to generate cold water, and thereby cold water generation efficiency may be greatly increased.

FIG. 13 is a graph illustrating variations in temperature of extracted water according to the number of extraction cups (1 cup: 120 ml), provided to compare the cooling effect of an exemplary embodiment of the present disclosure with that of a related art.

Referring to FIG. 13, the number of cups of extracted cold water having a temperature of 10° C. or lower is only 5 to 7 in Comparative Examples 1 to 3, which are products currently on the market. However, when the experiment is performed based on the exemplary embodiment of the present disclosure as illustrated in FIG. 6, the number of cups of extracted cold water having a temperature of 10° C. or lower is 20 to 21 for the same volume (approximately 2 liters) of the ice storage liquid. Exemplary Embodiment 1 uses water as the ice storage liquid, and Exemplary Embodiment 2 uses the ice storage liquid having a freezing point lowered to −0.5° C. Here, the number of cups of extracted cold water slightly increases in Exemplary Embodiment 2 in comparison to Exemplary Embodiment 1. However, when the freezing point of the ice storage liquid is lowered than that in Exemplary Embodiment 2, the number of cups of extracted cold water may further increase.

Meanwhile, FIG. 14 is a graph illustrating a relationship in temperature between the ice storage liquid and cold water during continuous extraction from the cold water generating tank 100 according to the exemplary embodiment of the present disclosure as illustrated in FIG. 6.

Referring to FIG. 14, even in the case of continuous extraction of cold water, compared with discontinuous extraction described with reference to FIG. 13, there may be little difference between an inflow temperature of ice storage liquid in the jetting member 160 and an outflow temperature of ice storage liquid in the intake member 141, conforming that the ice storage liquid efficiently circulates in the tank body 110.

When the continuous extraction is performed at a flow rate of 1 LPM (liter per minute), cold water having a temperature of 10° C. or lower is extracted for 116 seconds, which corresponds to 1.93 liters.

Compared with FIG. 13, even when the continuous extraction is performed, the number of cups of extracted cold water is 16 or more (130 ml basis), which represents significantly improved cooling efficiency compared to a related art.

Next, a water cooler 200 according to other exemplary embodiments of the present disclosure will be described with reference to FIGS. 15 to 29.

As illustrated in FIG. 15, a water cooler 200 according to another exemplary embodiment of the present disclosure may include a cold water generating tank 100 which generates cold water according to an ice thermal storage scheme, a cooling unit 220 for cooling an ice storage liquid accommodated in the cold water generating tank 100, and a water outlet 230 opened or closed to extract the cold water generated in the cold water generating unit 130. The water cooler 200 according to the exemplary embodiment of the present disclosure may further include a sensor unit 180 sensing a temperature or the like of the ice storage liquid, and a controller C controlling an operation of the cooling unit 220 according to a value sensed by the sensor unit 180. Moreover, the water cooler 200 according to the exemplary embodiment of the present disclosure may further include the filter unit 210 in front of the cold water generating tank 100 in order to filter raw water.

The water cooler 200 illustrated in FIG. 15, like the water cooler 200 illustrated in FIG. 1, may include the cold water generating tank 100, the cooling unit 220, and the water outlet 230, and further include the sensor unit 180, the controller C, and the filter unit 210. However, configurations of the cold water generating tank 100 and the controller C are different from those described with reference to FIGS. 1 to 14.

Accordingly, to avoid duplicated descriptions, detailed descriptions of configurations of the cooling unit 220, the water outlet 230, the sensor unit 180, and the filter unit 210 may be substituted by the description of those illustrated in FIG. 1, and configurations different from those illustrated in FIG. 1 will be mainly be provided.

According to the exemplary embodiment illustrated in FIGS. 15 to 29, the controller C may control an operation of the cooling unit 220 according to a value measured in the sensor unit 180.

That is, when a temperature of the ice storage liquid sensed by the sensor unit 180 is lower than a set temperature or a size (thickness) of the ice I formed on the cooling tube 120 is smaller than a set thickness, the controller C may drive the cooling unit 220 to lower the temperature of the ice storage liquid accommodated in the tank body 110 and grow the ice I formed on an outer circumferential surface of the cooling tube 120.

Accordingly, when the temperature of the ice storage liquid reaches the set temperature or the size of the ice I formed on the cooling tube 120 becomes equal to or larger than a certain value, the controller C may stop driving the cooling unit 220.

Meanwhile, when a water output signal is input from the water outlet 230, a shut-off valve (not shown) installed in the water outlet 230 may be opened to extract cold water.

In this manner, in accordance with opening of the water outlet 230, the water flowing in the cold water generating unit 130 may be cooled by heat exchange with the ice storage liquid and supplied to a user through the water outlet cock. In this process, when the temperature sensed by the sensor unit 180 is lower than the set temperature or the size (thickness) of the ice I formed on the cooling tube 120 is smaller than the set thickness, the cooling unit 220 may be operated.

In addition, when the user completes cold water extraction and the close signal is input to the controller C, the controller C may close the shut-off valve. Here, the operation of the cooling unit 220 may be stopped immediately after the close signal is input, or may be continued until the temperature of the ice storage liquid reaches the set temperature or the size of the ice I formed on the cooling tube 120 becomes equal to or larger than the certain value, Next, the cold water generating tank 100 installed in the water cooler 200 according to the exemplary embodiment of the present disclosure will be described with reference to FIGS. 15 to 19.

As illustrated in FIGS. 15 to 17 and FIG. 19, the cold water generating tank 100 may include a tank body 110 having an internal space of a predetermined size and accommodating an ice storage liquid, a cooling tube 120 installed in the internal space of the tank body 110 to cool the ice storage liquid accommodated in the tank body 110, and a cold water generating unit 130 in which inflowing water becomes cold water by heat exchange with the ice storage liquid.

The tank body 110 may separately include a tank main body 111 accommodating the ice storage liquid cooled by the cooling unit 220 and forming a space thereinside, and a tank cover 115 covering an opening of the tank main body 111. The tank body 110 may have a cylindrical shape as illustrated in FIG. 17, but is not limited thereto. The tank body 110 may have a hexahedral shape.

In addition, the cooling tube 120 may correspond to the above-described evaporator of the cooling unit 220. The cooling tube 120 may have a spiral shape, three-dimensionally, arranged to be elongated in a vertical direction in the tank body 110, as illustrated in FIG. 17. Meanwhile, although the cooling tube 120 and a heat exchange tube 131 are described as being arranged to be elongated in the vertical direction based on FIGS. 16 to 19 in the specification and claims, the cooling tube 120 and the heat exchange tube 131 may be arranged in a horizontal direction. In this regard, throughout the specification and claims, the vertical direction described according to the exemplary embodiment illustrated in FIGS. 16 to 19 may have the same meaning as a longitudinal direction of the cooling tube 120 and the heat exchange tube 131.

A refrigerant may flow inside the cooling tube 120, and the ice storage liquid may be frozen to form ice I on an outer circumferential surface of the cooling tube 120 when the cooling unit 220 is operated.

A thickness of the ice I may be measured by the sensor unit 180 sensing a temperature of the ice storage liquid and/or being in contact with the ice I. When a predetermined thickness of ice I is formed, the cooling unit 220 may be controlled to stop the operation thereof.

In addition, the cold water generating unit 130 may include the heat exchange tube 131 forming a flow path on which inflowing water becomes cold water by heat exchange with the ice storage liquid, and an extension member 135 protruding on an outer circumferential surface of the heat exchange tube 131 and in contact with the ice I formed around the cooling tube 120. Hereinafter, in order to clearly demonstrate that the extension member 135 described in the exemplary embodiment illustrated in FIGS. 1 to 14 is in contact with the ice I, the extension member 135 will be referred to as an ice contact member 135.

The heat exchange tube 131 may be arranged in the tank body 110 in a manner surrounding a circumference of the cooling tube 120. That is, as illustrated in FIG. 17, the heat exchange tube 131 may be arranged around the cooling tube 120 having the spiral shape, three-dimensionally, in the manner surrounding the circumference of the cooling tube 120.

Meanwhile, in FIG. 17, although a water inflow hole 131a and a water outflow hole 131b of the heat exchange tube 131 are illustrated as passing through one side of the tank body 110, a path of the heat exchange tube 131 may be variously modified. For example, a location of the water outflow hole 131b of the heat exchange tube 131 is illustrated differently in FIG. 15 from that illustrated in FIG. 17, for ease of illustration.

The heat exchange tube 131 may have a spiral shape, three-dimensionally, like the cooling tube 120.

As described in the exemplary embodiment illustrated in FIGS. 1 to 14, 'the spiral shape, three-dimensionally' described in the specification and claims may include a shape in which the heat exchange tube 131 or the cooling tube 120 has a polygonal structure as a whole in a plan view, as well as a shape in which the heat exchange tube 131 or the cooling tube 120 has a circular structure as a whole in a plan view illustrated in FIGS. 17 and 18. That is, 'the spiral shape, three-dimensionally' may refer to a shape continuously formed and wound, three-dimensionally, like a screw thread, regardless of whether the shape has the polygonal structure or the circular structure in a plan view.

Since the heat exchange tube 131 is arranged around the cooling tube 120, a diameter of a spiral (D2 in FIG. 16) formed by the heat exchange tube 131 may be greater than a diameter of a spiral (D1 in FIG. 16) formed by the cooling tube 120. Accordingly, the heat exchange tube 131 may have excellent workability and moldability.

For example, as described above, Korean Unexamined Patent Publication No. 2013-0035888 discloses that a heat exchange tube is bent at almost 180 degrees in order to install the heat exchange tube having a certain length (e.g. 5 meters) or longer in a narrow internal space of a tank body. In this case, since bursting may occur in a bend due to a large bending angle, a thickness of the heat exchange tube is increased (approximately 0.7 mm for a SUS material). However, according to the exemplary embodiment of the present disclosure as illustrated in FIGS. 16 to 19, since the heat exchange tube 131 is arranged around the cooling tube 120, the diameter (D2 in FIG. 16) of the spiral formed by the heat exchange tube 131 may increase and thereby the thickness of the heat exchange tube 131 may decrease (reduced to approximately 0.2 to 0.3=fora SUS material). Likewise, when the thickness of the heat exchange tube 131 decreases, heat exchange efficiency between the water flowing in the heat exchange tube 131 and the ice storage liquid may increase and cooling efficiency (efficiency of generating cold water) may also increase.

In addition, Korean Unexamined Patent Publication No. 2013-0035888 discloses a structure in which a cooling tube is disposed over a tank body and the heat exchange tube is disposed under the tank body. In this case, since the density of tubes is high at a lower portion of the tank body but low at an upper portion of the tank body, space utilization efficiency of the ice storage liquid is lowered and efficient use of the ice storage liquid is difficult. However, according to the exemplary embodiment of the present disclosure as illustrated in FIGS. 16 to 19, since the heat exchange tube 131 is disposed around the cooling tube 120, the density of tubes may be uniform at both upper and lower portions of the tank body 110. Accordingly, not only the space utilization efficiency of the ice storage liquid may increase, but also the ice storage liquid may be efficiently used at both upper and lower portions of the tank body 110. That is, since the distance between the heat exchange tube 131 and the cooling tube 120 is uniform throughout the total length of the heat exchange tube 131, the ice I formed on the outer circumferential surface of the cooling tube 120 having a relatively low temperature and the ice storage liquid having a low temperature around the cooling tube 120 may be efficiently used. In particular, since the heat exchange tube 131 disclosed in Korean Unexamined Patent Publication No. 2013-0035888 has a dense structure, flowing or mixing of the ice storage liquid is insufficient, resulting in unevenness of the temperature of the ice storage liquid. However, according to the exemplary embodiment of the present disclosure, since the cooling tube 120 and the heat exchange tube 131 are arranged to be adjacent to each other as a whole and the ice I formed on the outer circumferential surface of the cooling tube 120 is in direct contact with the ice contact member 135, cooling efficiency may be improved.

According to the exemplary embodiment of the present disclosure, since the cold of the ice I formed on the outer circumferential surface of the cooling tube 120 is directly transferred to the heat exchange tube 131 and the water flowing inside the heat exchange tube 131 through the ice contact member 135 by conduction, cold water generation efficiency may be increased.

In addition, as illustrated in FIGS. 16 and 17, the cooling tube 120 and the heat exchange tube 131 of the cold water generating unit 130 may be configured to maintain a constant distance in a width direction (or a diameter direction), and accordingly, a structure in which the ice contact member 135 is easily in contact with the ice I formed on the cooling tube 120 may be ensured. In particular, when the distance between the cooling tube 120 and the heat exchange tube 131 is not constant, a length (width) of the ice contact member 135 needs to be adjusted according to the distance between the cooling tube 120 and the heat exchange tube 131 so that the ice contact member 135 is in contact with the ice I formed around the cooling tube 120. However, when the cooling tube 120 and the heat exchange tube 131 maintains the constant distance, fabrication of the cold water generating unit 130 may be easier since the length (width) of the ice contact member 135 does not need to be adjusted.

In this manner, since the ice contact member 135 of the cold water generating unit 130 is in contact with the ice I formed on the outer circumferential surface of the cooling tube 120, a height (TH in FIG. 16) of the heat exchange tube 131 in a longitudinal direction may be set to be greater than the diameter (D1 in FIG. 16) of the spiral of the cooling tube 120, in order to extend a length of the cold water generating unit 130 in which the ice contact member 135 is in contact with the ice I. Through this, the internal space of the cooling tube 120 may be reduced, and the ice contact member 135 may be in sufficient contact with the ice I formed on the cooling tube 120 in the vertical direction (longitudinal direction).

Here, the height TH of the heat exchange tube 131 in the longitudinal direction may be 1.5 to 10 times, preferably 1.5 to 5 times, the diameter D1 of the spiral formed by the cooling tube 120. When the height TH of the heat exchange tube 131 in the longitudinal direction is smaller than the diameter D1 of the spiral formed by the cooling tube 120 by 1.5 times, the internal space of the cooling tube 120 may not be efficiently used since the diameter D1 of the spiral formed by the cooling tube 120 becomes relatively great. On the contrary, when the height TH of the heat exchange tube 131 in the longitudinal direction is greater than the diameter D1 of the spiral formed by the cooling tube 120 by 10 times, not only a length of the tank body 110 may become excessively large thereby limiting installation of the tank body 110 in the water cooler 200, but also the diameter D1 of the spiral formed by the cooling tube 120 may become excessively small, thereby limiting molding of the cooling tube 120.

Meanwhile, referring to FIG. 16, a portion of the ice contact member 135 facing the cooling tube 120 may be configured in such a manner that a width W1 of the portion protruding from the outer circumferential surface of the heat exchange tube 131 is greater than the outer diameter of the heat exchange tube 131. Here, when the ice I is in direct contact with the heat exchange tube 131, water flowing inside the heat exchange tube 131 may freeze and the heat exchange tube 131 may be frozen and burst. Accordingly, a generation thickness of the ice I or a temperature of the ice storage liquid may be controlled so that the ice I formed on the cooling tube 120 does not grow to the heat exchange tube 131. Moreover, in order to secure a more stable ice-contact structure, the ice contact member 135 may preferably be elongated to a certain degree. In this regard, the length W1 of the ice contact member 135 protruding from the outer circumferential surface of the heat exchange tube 131 may be greater than the outer diameter of the heat exchange tube 131.

However, when the length of the ice contact member 135 is excessively long, inefficiency in utilization of a space between the cooling tube 120 and the heat exchange tube 131 may increase since a distance between the cooling tube 120 and the heat exchange tube 131 becomes excessively far due to the ice contact member 135. Further, since an area in which the ice contact member 135 is in contact with the ice storage liquid instead of the ice I increases, heat transfer efficiency by conduction may be lowered. In this regard, the portion of the ice contact member 135 facing the cooling tube 120 may be configured in such a manner that the length W1 of the portion protruding from the outer circumferential surface of the heat exchange tube 131 is about 5 times the outer diameter of the heat exchange tube 131 or less.

In addition, as described above, in order to prevent the ice I from being in direct contact with the heat exchange tube 131, the portion of the ice contact member 135 facing the cooling tube 120 may be configured in such a manner that a length W2 protruding from a center of the heat exchange tube 131 is one third of a distance DL between centers of the cooling tube 120 and the heat exchange tube 131 or more. In this case as well, the length W1 of the portion protruding from the outer circumferential surface of the heat exchange tube 131 may be about 5 times the outer diameter of the heat exchange tube 131 or less.

In addition, as illustrated in FIG. 16, when the cold water generating unit 130 has the spiral shape, the ice contact member 135 may need to have a width W in a direction toward the cooling tube 120 greater than a height H in a direction perpendicular thereto. That is, the width W of the ice contact member 135 formed to be in contact with the cooling tube 120 may preferably be increased while maintaining the height H of the ice contact member 135 in the direction perpendicular to the direction toward the cooling tube 120 in order to minimize interference between the ice contact members 135 disposed on upper and lower portions of the heat exchange tube 131 having the spiral shape.

In addition, although the ice contact member 135 is illustrated as having the width W of the portion facing the cooling tube 120 greater than a width of the opposite portion thereto in FIG. 16, the ice contact member 135 is not limited thereto. Both of the portion facing the cooling tube 120 and the opposite portion thereto may have the increased width.

Meanwhile, although the shape of the ice contact member 135 is limited based on the widths W, W1, W2, and H of the ice contact member 135 and the distance DL between the centers of the cooling tube 120 and the heat exchange tube 131, the cold water generating tank 100 and the water cooler 200 according to the exemplary embodiments of the present disclosure may not be limited to those specific shapes of the ice contact member 135. It should be understood that any cold water generating tank and water cooler in which the ice contact member 135 is in contact with the ice I formed on the cooling tube 120 to cool the water flowing in the heat exchange tube 131, may be within the scope of the present inventive concept.

In addition, the ice contact member 135 of the cold water generating unit 130 may include a plurality of fin members integrally formed with the outer circumferential surface of the heat exchange tube 131 or installed on the outer circumferential surface of the heat exchange tube 131, around the heat exchange tube 131 (Hereinafter, the ice contact member 135 and the fin members are designated by the same reference numeral, 135).

As illustrated in FIG. 18, the fin members 135 may be arranged on the outer circumferential surface of the spiral-shaped heat exchange tube 131 at a predetermined interval. Although the fin members 135 are schematically illustrated as being in contact with each other in FIGS. 17 and 18, the fin members 135 may be arranged at a predetermined interval as illustrated in the enlarged view at the upper left corner of FIG. 18 so that the ice storage liquid can be in contact with the heat exchange tube 131 through a space between the fin members 135. Here, the fin members 135 may be arranged at the predetermined interval, but are not limited thereto. In addition, the fin members 135 may be installed in the entire area in which the heat exchange tube 131 is adjacent to the cooling tube 120, but are not limited thereto. The fin members 135 may be partially installed on the heat exchange tube 131 when the cold water generating unit 130 is formed by connecting a plurality of segmented heat exchange tube units 130u each other using a connection member 137, as illustrated in FIG. 22 to be described later.

The fin members 135 may be formed to have a rectangular cross-section or a circular or elliptical cross-section.

In addition, the fin members 135 may be formed of a material including aluminum or stainless steel (SUS). That is, the fin members 135 may be formed of stainless steel, which is the same material as the heat exchange tube 131, or aluminum to increase heat exchange efficiency. In addition, anti-corrosion coating may be performed on the heat exchange tube 131 to prevent corrosion thereof.

Meanwhile, as illustrated in FIG. 19, the cold water generating unit 130 may include a first portion (that is, a portion installed outside the cooling tube 120) surrounding the circumference of the cooling tube 120 in an outside of the cooling tube 120, and a second portion (that is, a portion provided installed inside the spiral of the cooling tube 120) passing through an inside of the spiral of the cooling tube 120. That is, the heat exchange tube 131 forming the cold water generating unit 130 may include the first portion installed to surround the cooling tube 120 in a spiral shape, and the second portion extending from the first portion or connected to the first portion and passing through a center of the spiral of the cooling tube 120. In addition, since the ice contact member 135 is formed on the outer circumferential surface of the heat exchange tube 131, the ice contact member 135 may be in contact with the ice I formed on the circumference of the cooling tube 120 at the inside and outside of the cooling tube 120. Accordingly, the contact area between the ice I and the ice contact member 135 according to the modified embodiment illustrated in FIG. 19 may be greater than that according to the exemplary embodiment illustrated in FIG. 16, cooling efficiency may be greatly improved.

Next, a cold water generating tank 100 according to another exemplary embodiment of the present disclosure will be described with reference to FIGS. 20 to 25.

The cold water generating tank 100 to be described with reference to FIGS. 20 to 25, like the cold water generating tank 100 described with reference to FIGS. 16 to 19, may include a tank body 110 having an internal space of a predetermined size and accommodating an ice storage liquid, a cooling tube 120 installed in the internal space of the tank body 110 to cool the ice storage liquid accommodated in the tank body 110, and a cold water generating unit 130 in which inflowing water becomes cold water by heat exchange with the ice storage liquid. The cold water generating unit 130 may include a heat exchange tube 131 and the ice contact member 135.

However, there are differences in that the cold water generating tank 100 illustrated in FIGS. 20 to 25 has a structure in which the cooling tube 120 and the cold water generating unit 130 are layered and stacked in a vertical direction in the tank body 110.

More specifically, in the cold water generating tank 100 illustrated in FIGS. 20 to 25, the cooling tube 120 formed in a zigzag pattern may form layers 120', 120", and 120''', and the cold water generating unit 130 may also form layers 130' and 130" between the layers 120', 120", and 120''' of the cooling tube 120.

Although the cooling tube 120 forms three layers 120', 120", and 120''' and the cold water generating unit 130 forms two layers 130' and 130" between the layers 120', 120", and 120''' of the cooling tube 120 in FIGS. 20 to 22, it should be understood that any cold water generating tank in which the cooling tube 120 and the cold water generating unit 130 have a layered structure may be within the scope of the present inventive concept.

The cooling tube 120 may form the zigzag pattern in each of the layers 120', 120", and 120''', and the layers 120', 120", and 120''' are connected. The cooling tube 120 may be integrally formed or completely combined by welding in order to prevent leakage of a refrigerant.

In addition, the heat exchange tube 131 of the cold water generating unit 130, like the cooling tube 120, may be integrally formed in the zigzag pattern, and fin members 135 may be arranged on the outer circumferential surface of the heat exchange tube 131 at a predetermined interval.

Alternatively, the cold water generating unit 130 may be formed by connecting a plurality of segmented heat exchange tube units 130u including the heat exchange tube 131 and the fin members 135. Here, the cold water generating unit 130 may have a structure forming a zigzag pattern as a whole, as illustrated in FIG. 20. However, the structure of the cold water generating unit 130 may be variously modified to have, for example, a spiral pattern on a plane instead of the zigzag pattern, as long as the cold water generating unit 130 forms a layered structure.

As illustrated in FIG. 22, the segmented heat exchange tube units 130u may have a structure in which the fin members 135 are arranged on the outer circumferential surface of the segmented heat exchange tube 131u.

Here, the plurality of segmented heat exchange tube units 130u may be connected by a connection member 137 connecting ends of the segmented heat exchange tube 131u. The connection member 137 may consist of, for example, tubing formed of a flexible material, but is not limited thereto. That is, a metallic connecting pipe may be attached to an end of the segmented heat exchange tube 131u by welding or the like.

In addition, a clamping member 138 may be used to tightly attach the connection member 137 to the end of the segmented heat exchange tube unit 131u.

In addition, the segmented heat exchange tube units 130u may be connected each other by the connection member 137 to form unit layers 130' and 130" forming a zigzag pattern or the like, and the unit layers 130' and 130" may be arranged over or under the cooling tube 120 to form the cold water generating unit 130 having a plurality of layers. That is, the unit layers 130' and 130" may respectively include heat exchange tubes 131' and 131" and fin members 135' and 135", and the unit layers 130' and 130" may be alternatively disposed between the unit layers 120', 120", and 120''' of the cooling tube 120 to form a laminated structure.

Referring to FIG. 21, due to the laminated structure, at least a portion of the extension member 135 included in cold water generating unit 130 may be in contact with the ice I formed on the cooling tube 120 on both sides thereof. That is, as illustrated in FIG. 21, fin members 135' formed in a unit layer 130' may be in contact with the ice I formed on the unit layers 120' and 120" of the cooling tube 120 disposed over and under the unit layer 130' on both sides (upper and lower sides) of the unit layer 130', and fin members 135" formed in the other unit layer 130" may be in contact with the ice I formed on the other unit layers 120" and 120''' of the cooling tube 120 disposed over and under the unit layer 130" on both sides (upper and lower sides) of the unit layer 130". Meanwhile, although the unit layers 130' and 130" of the cold water generating unit 130 are illustrated as being disposed between the unit layers 120', 120", and 120''' of the cooling tube 120 in FIG. 21, a portion of the extension member 135 may be configured to be in contact with the ice I formed on the cooling tube 120 at one side thereof, depending on the number of unit layers of the cold water generating unit 130 and the cooling tube 120, types of the outermost unit layers, or the like.

Meanwhile, although a direction of the zigzag pattern of the cooling tube 120 is parallel to a direction of the zigzag pattern of the cold water generating unit 130 according to the exemplary embodiment illustrated in FIGS. 20 and 21, the direction of the zigzag pattern of the cooling tube 120 may be perpendicular to the direction of the zigzag pattern of the cold water generating unit 130 according to a modified embodiment illustrated in FIGS. 23 and 24. Even in this case, at least a portion of the extension member 135 provided in the cold water generating unit 130 may be configured to be in contact with the ice I formed on the cooling tube 120 on both sides thereof, like the extension member 135 as illustrated in FIG. 24.

In addition, according to a modified embodiment illustrated in FIG. 25, the fin members 135' and 135" provided in the unit layers 120', 120" of the cold water generating unit 130 connect the plurality of heat exchange tubes 131' and 131". Although not illustrated in FIG. 25, the above-described connection member 137 may be used to connect the unit layers 120', 120".

According to a modified embodiment illustrated in FIG. 25, since the heat exchange tubes 131' and 131" provided in the unit layers 130' and 130" can be integrated, it may be easier to fabrication of the cold water generating unit 130 may become easier and heat transfer from the ice I may be uniformly performed.

Meanwhile, according to the exemplary embodiment and modified embodiments illustrated in FIGS. 20 to 25, a portion of the ice contact member 135 facing the cooling tube 120 may be configured to have a length (please refer to W1 in FIG. 16) protruding from the outer circumferential surface of the heat exchange tube 131 greater than an outer diameter of the heat exchange tube 131 and, that is, 5 times the outer diameter of the heat exchange tube 131 or less. In addition, in the portion of the ice contact member 135 facing the cooling tube 120, a length (please refer to W2 in FIG. 16) protruding from a center of the heat exchange tube 131 may be one third of a distance DL between a center of the cooling tube 120 and the center of the heat exchange tube 131 or more.

Next, a cold water generating tank 100 according to another exemplary embodiment of the present disclosure will be described with reference to FIGS. 26 to 28.

The cold water generating tank 100 illustrated in FIGS. 26 and 27 may be configured to have a structure in which a cooling tube 120 is disposed over a cold water generating unit 130, and an ice contact member 135 of the cold water generating unit 130 may be in contact with ice I formed on the cooling tube 120.

That is, as illustrated in FIG. 27, the ice contact member 135 arranged on an outer circumferential surface of the heat exchange tube 131 of the cold water generating unit 130 may be in contact with the ice I formed on a lower portion of the cooling tube 120. In this case, the ice contact member 135 may sufficiently extend toward the cooling tube 120 in order to increase a contact area between the ice contact member 135 and the ice I, compared to that described in the other exemplary embodiments of the present disclosure.

In addition, according to a modified embodiment illustrated in FIG. 28, two or more layers of the cold water generating unit 130 may be stacked under the cooling tube 120. Here, the ice contact member 135 may be connected to the heat exchange tube 131 of the layered cold water generating unit 130 so as to transfer heat to the cold water generating unit 130 far from the cooling tube 120 by being in contact with the ice I.

Meanwhile, as described in the exemplary embodiment illustrated in FIGS. 1 to 14, the ice storage liquid accommodated in the tank body 110 may be formed of water having a freezing point of 0° C., or an aqueous propylene glycol solution having a freezing point lower than 0° C. to increase heat capacity (heat content) of the ice storage liquid. A detailed description thereof may be substituted by the description described above.

Next, a process of generating cold water by the water cooler 200 and the cold water generating tank 100 according to an exemplary embodiments of the present disclosure will be described with reference to FIGS. 15, 16, and 29.

Referring to FIGS. 15, 16, and 29, when a temperature of the ice storage liquid measured by the sensor unit 180 is lower than a set temperature, or a size (thickness) of the ice I formed on the cooling tube 120 is smaller than a set thickness, the controller C may drive the cooling unit 220 to lower the temperature of the ice storage liquid accommodated in the tank body 110 and grow the ice I formed on the outer circumferential surface of the cooling tube 120. Meanwhile, although the ice I formed on the cooling tube 120 is illustrated to have a uniform thickness over the entire cooling tube 120 in FIGS. 16, 19, and 24, the shape of the ice I formed on the cooling tube 120 may vary depending on a pitch of the cooling tube 120 or a controlled size (thickness) of the ice I.

Accordingly, a predetermined size (thickness) of ice I may be formed on the outer circumferential surface of the cooling tube 120, and the controller C may stop driving the cooling unit 220 when the temperature of the ice storage liquid reaches the set temperature or the size of the ice I formed on the cooling tube 120 reaches or exceeds predetermined size (thickness) as illustrated in FIGS. 16 and 29.

Meanwhile, when a water output signal is input from the water outlet 230, the controller C may open a shut-off valve (not shown) installed in the water outlet 230 to extract cold water.

In this manner, when the water outlet 230 is opened, the water flowing in the cold water generating unit 130 may be cooled by heat exchange with the ice storage liquid to be supplied to a user through the water outlet cock.

During the process of extracting cold water, since the water flowing in the heat exchange tube 131 of the cold water generating unit 130 exchanges heat by receiving the coldness of the ice I in contact with the ice contact member 135, the heat exchange efficiency may be extremely high. As a result, a length of the heat exchange tube 131 may be shortened, thereby minimizing decrease in a flow rate according to increase in the length of the heat exchange tube 131.

According to an experimental embodiment, although a surface temperature of the ice I formed on the cooling tube 120 and the ice contact member 135 in direct contact with the ice I was 0° C., the temperature of the ice contact member 135 near an interface with the ice I was measured as about 0.6 to 0.8° C., and a surface temperature of the heat exchange tube 131 was measured as 1 to 2° C. As such, the surface temperature of the heat exchange tube 131 was significantly affected by the ice contact member 135 in contact with the ice I, resulting in active heat exchange with the water flowing in the heat exchange tube 131. Accordingly, the efficiency of generating cold water was greatly increased.

In particular, the greater the length of the ice contact member 135, the wider the initial contact area between the ice contact member 135 and the ice I may be. Accordingly, heat capacity by ice I may be increased. That is, the wider the contact area between the ice contact member 135 and the ice I, the greater the effect of increasing the amount of cold water extracted for a long period of time and at a temperature lower than a predetermined temperature even when the ice I is melt by heat exchange may be.

In this manner, according to exemplary embodiment of the present disclosure, by forming the ice contact member 135 on the outer circumferential surface of the heat exchange tube 131 configuring the cold water generating unit 130 and allowing the ice contact member 135 to be in contact with the ice I, a sufficient amount of cold water may be generated without using a pumping device or an agitator for circulation of the ice storage liquid. Although a circulation structure or agitating structure for the ice storage liquid is not illustrated in the specification, it is obvious that such circulation structure or agitating structure for the ice storage liquid may be adopted in order to further improve the efficiency of generating cold water according to the exemplary embodiment of the present disclosure. In this case, the circulation structure and/or agitating structure for the ice storage liquid, in addition to the ice contact member 135, may be within the scope of the present inventive concept.

In addition, according to the exemplary embodiment of the present disclosure, since the heat transfer by direct conduction between the ice I and the ice contact member 135 is implemented, the total volume of the ice storage liquid may be reduced and the length of the heat exchange tube 131 may be shortened due to rapid heat exchange and high heat exchange efficiency. Accordingly, decrease in flow rate caused by increase in length of the heat exchange tube 131 may be minimized.

Meanwhile, during the process of extracting cold water, when a temperature sensed by the sensor unit 180 is lower than a set temperature or the size (thickness) of the ice I formed on the cooling tube 120 is smaller than a set thickness, the cooling unit 220 may be operated.

In addition, when the user completes the process of extracting cold water and therefore a close signal is input to the controller C, the controller C may close the shut-off valve. Here, the operation of the cooling unit 220 may be controlled to stop immediately after the close signal to close the shut-off valve is input, or to continue until the temperature of the ice storage liquid reaches the set value or the size of the ice I formed on the cooling tube 120 becomes a certain size or more.

While exemplary embodiments have been shown and described above, it will be apparent to those skilled in the art that modifications and variations could be made without departing from the scope of the invention as defined by the appended claims.

In particular, the ice contact member 135 may be used as the extension member 135 in the exemplary embodiment illustrated in FIGS. 1 to 14, as well as in the exemplary embodiment illustrated in FIGS. 15 to 29. Further, the circulation unit 140 and the blocking member 190 may be provided in the exemplary embodiment illustrated in FIGS. 15 to 29, as well as in the exemplary embodiment illustrated in FIGS. 1 to 14.

DESCRIPTION OF REFERENCE NUMERALS

100 . . . COLD WATER GENERATING TANK
110 . . . TANK BODY
120 . . . COOLING TUBE
130 . . . COLD WATER GENERATING UNIT
130U . . . SEGMENTED HEAT EXCHANGE TUBE UNIT
131 . . . HEAT EXCHANGE TUBE
135 . . . EXTENSION MEMBER (ICE CONTACT MEMBER, FIN MEMBERS)
137 . . . CONNECTING MEMBER
140 . . . CIRCULATION UNIT
141 . . . INTAKE MEMBER
142 . . . SUPPLY TUBE
143 . . . MANIFOLD
150 . . . PUMPING MEMBER
155 . . . INTAKE MEMBER
160 . . . JETTING MEMBER
180 . . . SENSOR UNIT
190 . . . BLOCKING MEMBER
200 . . . WATER COOLER
210 . . . FILTER UNIT
220 . . . COOLING UNIT
230 . . . WATER OUTLET
C . . . CONTROLLER

The invention claimed is:

1. A cold water generating tank comprising:
a tank body accommodating an ice storage liquid cooled by a cooling unit;
a cooling tube included in the tank body and configured to cool the ice storage liquid accommodated in the tank body;
a cold water generating unit including a heat exchange tube configured to form a flow path on which inflowing water becomes cold water by heat exchange with the ice storage liquid and an extension member located in an outer circumferential surface of the heat exchange tube and configured to increase a contact area with the ice storage liquid; and
a circulation unit configured to circulate the ice storage liquid accommodated in the tank body,
wherein the cold water generating unit is installed inside the tank body to surround a circumference of the cooling tube,
wherein the cooling tube and the heat exchange tube each have a three-dimensional spiral shape, and the heat exchange tube surrounds the cooling tube,
wherein the circulation unit jets the ice storage liquid in a direction from the cooling tube toward the cold water generating unit,
wherein the circulation unit comprises a jetting member and a circulating pump,
wherein the jetting member is arranged in a center portion of the spiral shape of the cooling tube in a longitudinal direction of the cooling tube and is configured to jet the ice storage liquid to the cooling tube,
wherein the circulating pump is configured to intake the ice storage liquid in the tank body to supply the jetting member, and
wherein a space is provided between each turn of the cooling tube and the heat exchange tube in the longitudinal direction, and the jetting member is configured to circulate the ice storage liquid in a radial direction from a center portion of the cooling tube to the cold water generating unit.

2. The cold water generating tank of claim 1, wherein the circulation unit further includes an intake member configured to supply the ice storage liquid in the tank body to the circulating pump, and
the intake member is disposed in a space between a circumference of the cold water generating unit and the tank body.

3. The cold water generating tank of claim 1, wherein the jetting member extends in the longitudinal direction of the cooling tube and includes a plurality of injection holes.

4. The cold water generating tank of claim 1, wherein the circulating pump is disposed inside the tank body.

5. The cold water generating tank of claim 1, wherein the circulation unit includes a blocking member configured to restrict flow between the jetting member and the circulating pump to prevent the ice storage liquid jetted from the jetting member from directly flowing into the circulating pump.

6. The cold water generating tank of claim 1, wherein the cooling tube and the cold water generating unit form circular spiral shapes and maintain a constant distance therebetween.

7. The cold water generating tank of claim 1, wherein the extension member has a shape protruding from the outer circumferential surface of the heat exchange tube, and consist of an ice contact member configured to be in contact with ice formed on a circumference of the cooling tube.

8. The cold water generating tank of claim 7, wherein the cold water generating unit includes a first portion surrounding the circumference of the cooling tube and a second portion arranged in a center portion of the spiral shape of the cooling tube, and
the ice contact member located at the first portion and the second portion, respectively, is in contact with the ice formed on the circumference of the cooling tube.

9. The cold water generating tank of claim 7, wherein a portion of the ice contact member facing the cooling tube has a length protruding from the outer circumferential surface of the heat exchange tube greater than an outer diameter of the heat exchange tube.

10. The cold water generating tank of claim 7, wherein the ice contact member has a structure in which a width in a direction toward the cooling tube is greater than a width perpendicular to the direction toward the cooling tube.

11. The cold water generating tank of claim 1, wherein the extension member includes a plurality of fin members formed integrally with the outer circumferential surface of the heat exchange tube around the heat exchange tube or installed on the outer circumferential surface of the heat exchange tube, and
the fin members have a structure in which a portion adjacent to the cooling tube has a width greater than a height and extends toward the cooling tube.

12. A cold water generating tank comprising:
a tank body accommodating an ice storage liquid cooled by a cooling unit;
a cooling tube included in the tank body and configured to cool the ice storage liquid accommodated in the tank body;
a cold water generating unit including a heat exchange tube configured to form a flow path on which inflowing water becomes cold water by heat exchange with the ice storage liquid and an extension member located in an outer circumferential surface of the heat exchange tube and configured to increase a contact area with the ice storage liquid; and
a circulation unit comprising a jetting member, a circulating pump and a blocking member, configured to circulate the ice storage liquid accommodated in the tank body,
wherein the blocking member is configured to restrict flow between the jetting member and the circulating pump to prevent the ice storage liquid jetted from the jetting member from directly flowing into the circulating pump, and
wherein the blocking member has a diameter greater than a diameter of the spiral formed by the cooling tube.

13. The cold water generating tank of claim 12, wherein the cold water generating unit is installed inside the tank body to surround a circumference of the cooling tube.

14. The cold water generating tank of claim 12, wherein the cooling tube and the heat exchange tube each have a three-dimensional spiral shape, and the heat exchange tube surrounds the cooling tube.

15. The cold water generating tank of claim 12, wherein the circulation unit jets the ice storage liquid from the cooling tube toward the cold water generating unit.

16. The cold water generating tank of claim 12, wherein the jetting member is arranged in a center portion of the spiral shape of the cooling tube in a longitudinal direction of the cooling tube and is configured to circulate the ice storage liquid to the cooling tube, and the circulating pump is configured to intake the ice storage liquid in the tank body to supply the jetting member.

* * * * *